(12) United States Patent
Han et al.

(10) Patent No.: US 12,003,986 B2
(45) Date of Patent: Jun. 4, 2024

(54) COMMUNICATION METHOD AND DEVICE

(71) Applicant: Huawei Technologies Co., Ltd., Shenzhen (CN)

(72) Inventors: Jing Han, Beijing (CN); Xi Zhang, Ottawa (CA); Hong Li, Beijing (CN); Meng Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 377 days.

(21) Appl. No.: 17/402,122

(22) Filed: Aug. 13, 2021

(65) Prior Publication Data
US 2021/0409985 A1 Dec. 30, 2021

Related U.S. Application Data

(63) Continuation of application No. PCT/CN2019/130768, filed on Dec. 31, 2019.

(30) Foreign Application Priority Data

Feb. 15, 2019 (CN) .......................... 201910117919.1

(51) Int. Cl.
*H04W 24/08* (2009.01)
*H04L 5/00* (2006.01)
*H04W 24/04* (2009.01)

(52) U.S. Cl.
CPC ........... *H04W 24/08* (2013.01); *H04L 5/0048* (2013.01); *H04L 5/0053* (2013.01); *H04W 24/04* (2013.01)

(58) Field of Classification Search
CPC ..... H04W 24/08; H04W 24/04; H04W 48/16; H04W 72/046; H04W 72/23;
(Continued)

(56) References Cited

U.S. PATENT DOCUMENTS 8,976,698 B2 3/2015 Chen et al.
9,479,306 B2 10/2016 Mazzarese et al.
(Continued)

FOREIGN PATENT DOCUMENTS

CN 103391576 A 11/2013
CN 104081813 A 10/2014
(Continued)

OTHER PUBLICATIONS

Huawei, HiSilicon, CR to BFD requriements (section 8.5.2, 8.5.3), 3GPP TSG-WG4 Meeting #89, Spokane, US, Nov. 12-16, 2018, R4-1816587 (Year: 2018).*
(Continued)

*Primary Examiner* — Shailendra Kumar
(74) *Attorney, Agent, or Firm* — Slater Matsil, LLP

(57) ABSTRACT

This application provides a communication method and device. The method includes: A terminal device receives a reference signal from a network device, wherein the reference signal is not in a channel state information-reference signal (CSI-RS) resource set, configured with repetition on; and performs radio link monitoring (RLM) measurement or beam failure detection (BFD) measurement on the reference signal. According to the communication method and device provided in this application, the terminal device expects that the resource configured by the network device for performing BFD or RLM is not any resource in the CSI-RS resource set configured with the repetition on.

13 Claims, 9 Drawing Sheets

S401
A terminal device measures at least one first reference signal sent by a network device on at least one resource, and determines a resource corresponding to a maximum RSRP S402
The terminal device determines a first resource configured by the network device for performing RLM or BFD S403
The terminal device performs RLM or BFD on the first resource by using a receive beam corresponding to the maximum RSRP

(58) Field of Classification Search
CPC .... H04W 24/10; H04L 5/0048; H04L 5/0053; H04L 5/0023
See application file for complete search history.

(56) References Cited

U.S. PATENT DOCUMENTS

| | | | |
|---|---|---|---|
| 10,404,345 | B2 | 9/2019 | Xiao et al. |
| 10,567,201 | B2 | 2/2020 | Wang et al. |
| 2013/0286960 | A1 | 10/2013 | Li et al. |
| 2014/0043988 | A1* | 2/2014 | Chen ............... H04L 1/0026 370/252 |
| 2018/0054822 | A1 | 2/2018 | Kim et al. |
| 2018/0269950 | A1 | 9/2018 | John Wilson et al. |
| 2020/0107337 | A1* | 4/2020 | Lin .................. H04L 1/0026 |
| 2020/0178312 | A1 | 6/2020 | Jiang |

FOREIGN PATENT DOCUMENTS

| | | |
|---|---|---|
| CN | 104509018 A | 4/2015 |
| CN | 104620551 A | 5/2015 |
| CN | 108111282 A | 6/2018 |
| CN | 108476480 A | 8/2018 |
| CN | 108924920 A | 11/2018 |
| WO | 2016144002 A1 | 9/2016 |
| WO | 2018026661 A1 | 2/2018 |
| WO | 2018171647 A1 | 9/2018 |
| WO | 2018199653 A1 | 11/2018 |
| WO | WO-2020054074 A1 * | 3/2020 |

OTHER PUBLICATIONS

Mediatek Inc., "CR on TS38.133 for RLM requirements (section 8.1.1, 8.1.3.1, 8.1.2.2, 8.1.3.2 and 8.1.7)", 3GPP TSG RAB WG4 Meeting #88-BIS, R4-1812510, Oct. 8-12, 2018, 8 pages, Chengdu, China.

LG Electronics, "Remaining issues on simultaneous Tx/Rx", 3GPP TSG RAN WG1 Meeting #94, R1-1808489, Aug. 20-24, 2018, 5 pages, Gothenburg, Sweden.

3rd Generation Partnership Project, Technical Specification Group Radio Access Network, NR, Requirements for support of radio resource management (Release 15), 3GPP TS 38.133 V15.4.0 (Dec. 2018), 2018, 876 pages.

3rd Generation Partnership Project, Technical Specification Group Radio Access Network, NR, Physical layer procedures for data(Release 15), 3GPP TS 38.214 V15.4.0 (Dec. 2018), 2018, 102 pages.

NTT DOCOMO, Inc., "Summary on offline discussion on remaining issues regarding scheduling availability", 3GPP TSG RAN WG4 Meeting #87, R4-1808445, May 21-25, 2018, 6 pages, Busan, Korea.

Huawei et al., "Further discussion on BFD requirements", 3GPP TSG-RAN WG4 Meeting #89, R4-1815174, Nov. 12-16, 2018, 5 pages, Spokane, US.

LG Electronics, "Discussion on UE behavior on reception of channels or RS in the same OFDM symbol", 3GPP TSG-RAN WG4 Meeting #88bis, R4-1812481, Oct. 8-12, 2018, 3 pages, Chengdu, China.

Huawei, HiSilicon, "CR to BFD requriements (section 8.5.2, 8.5.3)", 3GPP TSG-WG4 Meeting #89, R4-1816680, Nov. 12-16, 2018, 5 pages, Spokane, US.

Huawei, HiSilicon, "On requirements for L 1-RSRP measurement for beam reporting", 3GPP TSG-RAN WG4 Meeting #89, R4-1815177, Nov. 12-16, 2018, 6 pages, Spokane, US.

Huawei, HiSilicon, "Remaining issues for BFD requirements", 3GPP TSG-RAN WG4 Meeting #90, R4-1901169, 25th Feb.-Mar. 1, 2019, 5 pages, Athens, Greece.

"CR to BFD requnements (section 8.5.2, 8.5.3)," Source to WG: Huawei, HiSilicon, Source to TSG: R4, Work item code: NR_newRAT-Perf, Date: Oct. 18, 2018, Category: F, Release: Rel-15, Change Request, 38.133, Current version: 15.3.0, 3GPP TSG-WG4 Meeting #89, R4-1816587, Spokane, US, Nov. 12-16, 2018, 6 pages.

\* cited by examiner

COMMUNICATION METHOD AND DEVICE

CROSS-REFERENCE TO RELATED APPLICATIONS

This application is a continuation of International Application No. PCT/CN2019/130768, filed on Dec. 31, 2019, which claims priority to Chinese Patent Application No. 201910117919.1, filed on Feb. 15, 2019. The disclosures of the aforementioned applications are hereby incorporated by reference in their entireties.

TECHNICAL FIELD

This application relates to the communications field, and in particular, to a communication method and device.

BACKGROUND

Quasi co-location (QCL) of antenna ports is a state assumption of the antenna ports. When two antenna ports are configured to have a QCL association, a terminal may consider that all or a part of parameters of channels from the two ports to the terminal are the same. The parameter of the channel includes one or more of a delay spread, a Doppler spread, a Doppler shift, an average channel gain, an average delay, a parameter of a reception filter, a receive beam, or the like. The foregoing parameter evaluated by the terminal based on a reference signal of one of the ports may be applicable to the other port. A base station may configure, for the terminal in a transmission configuration indicator (TCI), a quasi co-location (QCL) reference signal available for first information. The terminal determines, based on the reference signal to which the TCI points, a receive parameter, such as a receive beam, used to receive the first information.

Channel state information-reference signal (CSI-RS)-based beam measurement is performed on a per-CSI-RS resource set basis. When the CSI-RS resource set is configured with repetition off (where the repetition is configured as off), the terminal may measure different transmit beams, and report an optimal transmit beam with relatively good performance to the base station. The base station may further send a same transmit beam (where the transmit beam may be the foregoing optimal transmit beam) on all resources in a CSI-RS resource set configured with repetition on (where the repetition is configured as on), so that the terminal tries different receive beams on different resources to select an optimal receive beam corresponding to the transmit beam.

When a resource to which the TCI points is a resource in the resource set configured with the repetition on, a reference signal corresponding to the resource to which the TCI points may be inconsistent with a reference signal corresponding to the optimal receive beam determined by the terminal. In this case, the terminal cannot determine the receive beam. The terminal may receive a signal by using a second optimal receive beam, and consequently performance of communication between the terminal and the base station deteriorates. Therefore, how to determine a receive beam is a technical problem that needs to be resolved urgently.

SUMMARY

This application provides a communication method and a device, to resolve a problem of communication performance deterioration that may be caused because an existing terminal device cannot determine a receive beam.

According to a first aspect, this application provides a communication method. The method includes:

A communication device receives a reference signal from a network device, where the reference signal is not in a channel state information-reference signal CSI-RS resource set, and the CSI-RS resource set is configured with repetition on; and performs radio link monitoring RLM measurement or beam failure detection BFD measurement on the reference signal.

In a possible design of the first aspect, the CSI-RS resource set is a periodic resource, and a measurement period T of the CSI-RS resource set is obtained based on a quantity that is of resource repetitions in the CSI-RS resource set and that is preferred by the communication device, a quantity of resources in the CSI-RS resource set, and a resource periodicity of the CSI-RS resource set.

In a possible design of the first aspect, that a measurement period T is obtained based on a quantity that is of resource repetitions in the CSI-RS resource set and that is preferred by the communication device, a quantity of resources in the CSI-RS resource set, and a resource periodicity of the CSI-RS resource set includes: Measurement period $T=m*\text{ceil}(\text{max\_Number\_Rx\_Beam}/N)*T\_\text{res}$, where m is a positive integer greater than 0, max_Number_Rx_Beam is the quantity that is of resource repetitions in the CSI-RS resource set and that is preferred by the communication device, N is the quantity of resources in the CSI-RS resource set, and T_res is the resource periodicity of the CSI-RS resource set.

According to a second aspect, this application provides a communication method. The method includes:

A network device generates a reference signal, where the reference signal is not in a channel state information-reference signal CSI-RS resource set, the CSI-RS resource set is configured with repetition on, and the reference signal is used for radio link monitoring RLM measurement or beam failure detection BFD measurement; and the network device sends the reference signal.

In a possible design of the second aspect, the CSI-RS resource set is a periodic resource, and a measurement period T of the CSI-RS resource set is obtained based on a quantity that is of resource repetitions in the CSI-RS resource set and that is preferred by the communication device, a quantity of resources in the CSI-RS resource set, and a resource periodicity of the CSI-RS resource set.

In a possible design of the second aspect, that a measurement period T is obtained based on a quantity that is of resource repetitions in the CSI-RS resource set and that is preferred by the communication device, a quantity of resources in the CSI-RS resource set, and a resource periodicity of the CSI-RS resource set includes: Measurement period $T=m*\text{ceil}(\text{max\_Number\_Rx\_Beam}/N)*T\_\text{res}$, where m is a positive integer greater than 0, max_Number_Rx_Beam is the quantity that is of resource repetitions in the CSI-RS resource set and that is preferred by the communication device, N is the quantity of resources in the CSI-RS resource set, and T_res is the resource periodicity of the CSI-RS resource set.

According to a third aspect, this application provides a communication device. The communication device includes: a memory, a processor, and a computer program, where the computer program is stored in the memory, and the processor runs the computer program to perform the communication method according to any one of possible designs of the first aspect.

According to a fourth aspect, this application provides a storage medium. The storage medium includes a computer program, and the computer program is used to implement the communication method according to the first aspect.

According to a fifth aspect, this application provides a network device. The network device includes: a memory, a processor, and a computer program, where the computer program is stored in the memory, and the processor runs the computer program to perform the communication method according to the second aspect.

According to a sixth aspect, this application provides a storage medium. The storage medium includes a computer program, and the computer program is used to implement the communication method according to the second aspect.

According to a seventh aspect, this application provides a communication system. The communication system includes: the communication device according to the third aspect and the network device according to the fifth aspect.

According to an eighth aspect, this application provides a communication method. The method includes:

A terminal device measures a plurality of first reference signals sent by a network device on a plurality of resources in a CSI-RS resource set configured with repetition on, and determines a resource corresponding to a maximum reference signal received power RSRP, that is, determines an optimal receive beam. When a TCI state of first information configured by the network device points to any resource in the CSI-RS resource set, the terminal device determines that the resource that the resource to which the TCI state points/ the first information and the resource corresponding to the maximum RSRP are QCL-ed.

In this embodiment, the terminal device receives a PDCCH or a PDSCH by using a receive beam that corresponds to the resource corresponding to the maximum RSRP. This avoids communication performance deterioration that may be caused because the terminal device cannot determine the receive beam.

In an implementation, the first information is information carried on a physical downlink control channel PDCCH or a physical downlink shared channel PDSCH.

In another implementation, the first information may further be a second reference signal used to perform any one of the following measurement: time-frequency tracking reference signal TRS measurement, CSI measurement, radio link monitoring RLM, or beam failure detection BFD.

In a possible design of the eighth aspect, before determining the resource corresponding to the maximum RSRP, the terminal device further receives beam measurement reporting information sent by the network device, where the beam measurement reporting information indicates the terminal device to report only one RSRP, and the beam measurement reporting information further indicates the terminal device to be prohibited from reporting RSRPs corresponding to a plurality of resources that can be simultaneously received.

In this embodiment, the terminal device performs reporting based on the received beam measurement reporting information, so that inconsistency between measurement behavior and measurement reporting information is avoided, resource waste caused by reporting the plurality of RSRPs by the terminal device is avoided, and the network device conveniently determines a current channel condition of the terminal device to perform communication scheduling.

In a possible design of the eighth aspect, the communication method further includes:

The terminal device sends the maximum RSRP to the network device based on the beam measurement reporting information; and that the terminal device determines that the resource to which the TCI state points and the resource corresponding to the maximum RSRP are QCL-ed or the first information and the resource corresponding to the maximum RSRP are QCL-ed includes:

The terminal device determines, after a first preset time period after the terminal device sends the maximum RSRP to the network device, that the resource to which the TCI state points and the resource corresponding to the maximum RSRP are QCL-ed or the first information and the resource corresponding to the maximum RSRP are QCL-ed.

In a possible design of the eighth aspect, the communication method further includes:

The terminal device determines the first preset time period based on a capability reported by the terminal device.

In a possible design of the eighth aspect, that the terminal device determines that the resource to which the TCI state points and the resource corresponding to the maximum RSRP are QCL-ed or the first information and the resource corresponding to the maximum RSRP are QCL-ed includes:

The terminal device determines, after a second preset time period after an end moment of the last resource in the CSI-RS resource set, that the resource to which the TCI state points and the resource corresponding to the maximum RSRP are QCL-ed or the first information and the resource corresponding to the maximum RSRP are QCL-ed.

In a possible design of the eighth aspect, the communication method further includes:

The terminal device determines the second preset time period based on a capability reported by the terminal device.

In a possible design of the eighth aspect, the determining a resource corresponding to a maximum RSRP includes:

The terminal device determines, within a third preset time period including the CSI-RS resource set, the resource corresponding to the maximum RSRP, or determines the maximum RSRP and the resource corresponding to the maximum RSRP.

In a possible design of the eighth aspect, the CSI-RS resource set is a periodic resource, the third preset time period is obtained based on a measurement period T, and the measurement period T is obtained based on a quantity that is of resource repetitions in the CSI-RS resource set and that is preferred by the terminal device, a quantity of resources in the CSI-RS resource set, and a resource periodicity of the CSI-RS resource set.

In a possible design of the eighth aspect, that the measurement period T is obtained based on a quantity that is of resource repetitions in the CSI-RS resource set and that is preferred by the terminal device, a quantity of resources in the CSI-RS resource set, and a resource periodicity of the CSI-RS resource set includes: Measurement period $T=m*\text{ceil}(\text{max\_Number\_Rx\_Beam}/N)*T\_res$, where m is a positive integer greater than 0, max_Number_Rx_Beam is the quantity that is of resource repetitions in the CSI-RS resource set and that is preferred by the terminal device, N is the quantity of resources in the CSI-RS resource set, and T_res is the resource periodicity of the CSI-RS resource set.

According to a ninth aspect, this application further provides a communication method. The method includes:

A terminal device measures at least one first reference signal sent by a network device on at least one resource, and determines a resource corresponding to a maximum reference signal received power RSRP, where the at least one resource belongs to a channel state information-reference signal CSI-RS resource set, and the CSI-RS resource set is configured with repetition on; the terminal device determines a first resource configured by the network device for performing radio link monitoring RLM or beam failure detection BFD, where the first resource is a resource in the CSI-RS resource set; and the terminal device determines to perform RLM or BFD by using any resource in the CSI-RS resource set.

In a possible design of the ninth aspect, that the terminal device determines to perform RLM or BFD by using any resource in the CSI-RS resource set includes:

The terminal device determines to perform RLM or BFD by using the resource corresponding to the maximum RSRP.

In a possible design of the ninth aspect, the communication method further includes:

The terminal device receives beam measurement reporting information, where the beam measurement reporting information indicates the terminal device to report only one RSRP, and the beam measurement reporting information further indicates the terminal device to be prohibited from reporting RSRPs corresponding to a plurality of resources that can be simultaneously received.

In a possible design of the ninth aspect, the communication method further includes:

The terminal device sends the maximum RSRP to the network device based on the beam measurement reporting information; and that the terminal device determines to perform RLM or BFD by using any resource in the CSI-RS resource set includes:

The terminal device determines, after a first preset time period after the terminal device sends the maximum RSRP to the network device, to perform RLM or BFD by using any resource in the CSI-RS resource set.

In a possible design of the ninth aspect, the communication method further includes:

The terminal device determines the first preset time period based on a capability reported by the terminal device.

In a possible design of the ninth aspect, that the terminal device determines to perform RLM or BFD by using any resource in the CSI-RS resource set includes:

The terminal device determines, after a second preset time period after an end moment of the last resource in the CSI-RS resource set, to perform RLM or BFD by using any resource in the CSI-RS resource set.

In a possible design of the ninth aspect, the communication method further includes:

The terminal device determines the second preset time period based on a capability reported by the terminal device.

In a possible design of the ninth aspect, the determining a resource corresponding to a maximum RSRP includes:

The terminal device determines, within a third preset time period including the CSI-RS resource set, the resource corresponding to the maximum RSRP, or determines the maximum RSRP and the resource corresponding to the maximum RSRP.

In a possible design of the ninth aspect, the CSI-RS resource set is a periodic resource, the third preset time period is obtained based on a measurement period T, and the measurement period T is obtained based on a quantity that is of resource repetitions in the CSI-RS resource set and that is preferred by the terminal device, a quantity of resources in the CSI-RS resource set, and a resource periodicity of the CSI-RS resource set.

In a possible design of the ninth aspect, that the measurement period T is obtained based on a quantity that is of resource repetitions in the CSI-RS resource set and that is preferred by the terminal device, a quantity of resources in the CSI-RS resource set, and a resource periodicity of the CSI-RS resource set includes: Measurement period T=m*ceil(max_Number_Rx_Beam/N)*T_res, where m is a positive integer greater than 0, max_Number_Rx_Beam is the quantity that is of resource repetitions in the CSI-RS resource set and that is preferred by the terminal device, N is the quantity of resources in the CSI-RS resource set, and T_res is the resource periodicity of the CSI-RS resource set.

According to a tenth aspect, this application further provides a communication method. The method includes:

A terminal device measures at least one first reference signal sent by a network device on at least one resource, and determines a resource corresponding to a maximum reference signal received power RSRP, where the at least one resource belongs to a channel state information-reference signal CSI-RS resource set, and the CSI-RS resource set is configured with repetition on; the terminal device determines a first resource configured by the network device for performing RLM or BFD, where the first resource is a resource in the CSI-RS resource set; and the terminal device performs RLM or BFD on the first resource by using a receive beam corresponding to the maximum RSRP.

In a possible design of the tenth aspect, the communication method further includes:

The terminal device receives beam measurement reporting information, where the beam measurement reporting information indicates the terminal device to report only one RSRP, and the beam measurement reporting information further indicates the terminal device to be prohibited from reporting RSRPs corresponding to a plurality of resources that can be simultaneously received.

In a possible design of the tenth aspect, the communication method further includes:

The terminal device sends the maximum RSRP to the network device based on the beam measurement reporting information; and that the terminal device performs RLM or BFD on the first resource by using a receive beam corresponding to the maximum RSRP includes:

The terminal device determines, after a first preset time period after the terminal device sends the maximum RSRP to the network device, to perform RLM or BFD on the first resource by using the receive beam corresponding to the maximum RSRP.

In a possible design of the tenth aspect, the communication method further includes:

The terminal device determines the first preset time period based on a capability reported by the terminal device.

In a possible design of the tenth aspect, that the terminal device performs RLM or BFD on the first resource by using a receive beam corresponding to the maximum RSRP includes:

The terminal device determines, after a second preset time period after an end moment of the last resource in the CSI-RS resource set, to perform RLM or BFD on the first resource by using the receive beam corresponding to the maximum RSRP.

In a possible design of the tenth aspect, the communication method further includes:

The terminal device determines the second preset time period based on a capability reported by the terminal device.

In a possible design of the tenth aspect, the determining a resource corresponding to a maximum RSRP further includes:

The terminal device determines, within a third preset time period including the CSI-RS resource set, the resource corresponding to the maximum RSRP, or determines the maximum RSRP and the resource corresponding to the maximum RSRP.

In a possible design of the tenth aspect, the CSI-RS resource set is a periodic resource, the third preset time period is obtained based on a measurement period T, and the measurement period T is obtained based on a quantity that is of resource repetitions in the CSI-RS resource set and that is preferred by the terminal device, a quantity of resources in the CSI-RS resource set, and a resource periodicity of the CSI-RS resource set.

In a possible design of the tenth aspect, that the measurement period T is obtained based on a quantity that is of resource repetitions in the CSI-RS resource set and that is preferred by the terminal device, a quantity of resources in the CSI-RS resource set, and a resource periodicity of the CSI-RS resource set includes: Measurement period $T=m*\text{ceil}(\text{max\_Number\_Rx\_Beam}/N)*T\_res$, where m is a positive integer greater than 0, max_Number_Rx_Beam is the quantity that is of resource repetitions in the CSI-RS resource set and that is preferred by the terminal device, N is the quantity of resources in the CSI-RS resource set, and T_res is the resource periodicity of the CSI-RS resource set.

According to an eleventh aspect, this application further provides a communication method. The method is applied to a network device side, and has method steps corresponding to the communication method on the terminal device side according to the eighth aspect.

In a possible design of the eleventh aspect, the communication method includes:

A network device sends beam measurement reporting information to a terminal device, where the beam measurement reporting information indicates the terminal device to report only one RSRP, and the beam measurement reporting information further indicates the terminal device to be prohibited from reporting RSRPs of a plurality of resources that can be simultaneously received; the network device sends at least one first reference signal to the terminal device, where the at least one first reference signal is carried on at least one resource in a CSI-RS resource set, the beam measurement reporting information further indicates the terminal device to measure the at least one first reference signal and determine a maximum RSRP, and the CSI-RS resource set is configured with repetition on; and the network device receives the maximum RSRP sent by the terminal device.

According to a twelfth aspect, this application further provides a communication method. The method includes:

A terminal device receives a transmission configuration indicator TCI state of first information, where the TCI state does not point to any resource in a channel state information-reference signal CSI-RS resource set, and the CSI-RS resource set is configured with repetition on; and the terminal device receives the first information from a network device based on the TCI state of the first information, where the first information is a reference signal, or information carried on a PDCCH or a PDSCH; and the reference signal may be a reference signal used to perform any one of the following measurement: TRS measurement, CSI measurement, RLM, or BFD.

According to a thirteenth aspect, this application further provides a communication method. The method is applied to a network device side, and has method steps corresponding to the communication method on the terminal device side according to the twelfth aspect.

In a possible design of the thirteenth aspect, the communication method includes:

A network device sends a TCI state of first information to a terminal device, where the TCI state does not point to any resource in a CSI-RS resource set, and the CSI-RS resource set is configured with repetition on; and the network device sends the first information to the terminal device, where the first information is a reference signal, or information carried on a PDCCH or a PDSCH; and the reference signal may be a reference signal used to perform any one of the following measurement: TRS measurement, CSI measurement, RLM, or BFD.

According to a fourteenth aspect, this application further provides a communication method. The method includes:

A terminal device receives a reference signal sent by a network device, where the reference signal is not any resource in a channel state information-reference signal CSI-RS resource set, and the CSI-RS resource set is configured with repetition on; and the reference signal may be a reference signal used to perform RLM measurement or BFD measurement.

According to a fifteenth aspect, this application further provides a communication method. The method is applied to a network device side, and has method steps corresponding to the communication method on the terminal device side according to the twelfth aspect.

In a possible design of the fifteenth aspect, the communication method includes:

A network device sends a reference signal to a terminal device, where the reference signal is not any resource in a CSI-RS resource set, and the CSI-RS resource set is configured with repetition on; and the reference signal may be a reference signal used to perform RLM measurement or BFD measurement.

According to a sixteenth aspect, this application provides a communication device. The communication device may be used as a terminal device to perform the communication method according to the eighth aspect, and has a same or similar technical feature and technical effect.

In a possible design of the sixteenth aspect, the communication device includes:

a measurement module, configured to: measure at least one first reference signal sent by a network device on at least one resource, and determine a resource corresponding to a maximum RSRP, where the at least one resource belongs to a CSI-RS resource set, and the CSI-RS resource set is configured with repetition on;

a receiving module, configured to receive a TCI state of first information, where the TCI state points to any resource in the CSI-RS resource set; and a processing module, configured to determine that the resource to which the TCI state points and the resource corresponding to the maximum RSRP are quasi co-located QCL-ed or the first information and the resource corresponding to the maximum RSRP are quasi co-located QCL-ed.

In a possible design of the sixteenth aspect, the first information is information carried on a PDCCH or a PDSCH, or is a second reference signal used to perform any one of the following measurement:

TRS measurement, CSI measurement, RLM measurement, or BFD measurement.

In a possible design of the sixteenth aspect, the receiving module is further configured to: receive beam measurement reporting information, where the beam measurement reporting information indicates the communication device to report only one RSRP, and the beam measurement reporting information further indicates the communication device to be prohibited from reporting RSRPs corresponding to a plurality of resources that can be simultaneously received.

In a possible design of the sixteenth aspect, the communication device further includes:

a sending module, configured to send the maximum RSRP to the network device based on the beam measurement reporting information, where the processing module is specifically configured to determine, after a first preset time period after the maximum RSRP is sent to the network device, that the resource to which the TCI state points and the resource corresponding to the maximum RSRP are QCL-ed or the first information and the resource corresponding to the maximum RSRP are QCL-ed.

In a possible design of the sixteenth aspect, the processing module is further configured to determine the first preset time period based on a capability reported by the communication device.

In a possible design of the sixteenth aspect, the processing module is specifically configured to determine, after a second preset time period after an end moment of the last resource in the CSI-RS resource set, that the resource to which the TCI state points and the resource corresponding to the maximum RSRP are QCL-ed or the first information and the resource corresponding to the maximum RSRP are QCL-ed.

In a possible design of the sixteenth aspect, the processing module is further configured to determine the second preset time period based on a capability reported by the communication device.

In a possible design of the sixteenth aspect, the measurement module is specifically configured to: determine, within a third preset time period including the CSI-RS resource set, the resource corresponding to the maximum RSRP, or determine the maximum RSRP and the resource corresponding to the maximum RSRP.

In a possible design of the sixteenth aspect, the CSI-RS resource set is a periodic resource, the third preset time period is obtained based on a measurement period T, and the measurement period T is obtained based on a quantity that is of resource repetitions in the CSI-RS resource set and that is preferred by the terminal device, a quantity of resources in the CSI-RS resource set, and a resource periodicity of the CSI-RS resource set.

In a possible design of the sixteenth aspect, Measurement period $T=m*ceil(max\_Number\_Rx\_Beam/N)*T\_res$, where m is a positive integer greater than 0, max_Number_Rx_Beam is the quantity that is of resource repetitions in the CSI-RS resource set and that is preferred by the terminal device, N is the quantity of resources in the CSI-RS resource set, and T_res is the resource periodicity of the CSI-RS resource set.

According to a seventeenth aspect, this application further provides a communication device. The communication device may be used as a terminal device to perform the communication method according to the ninth aspect, and has a same or similar technical feature and technical effect.

In a possible design of the seventeenth aspect, the communication device includes:

a measurement module, configured to: measure at least one first reference signal sent by a network device on at least one resource, and determine a resource corresponding to a maximum reference signal received power RSRP, where the at least one resource belongs to a channel state information-reference signal CSI-RS resource set, and the CSI-RS resource set is configured with repetition on; and a processing module, configured to determine a first resource configured by the network device for performing radio link monitoring RLM or beam failure detection BFD, where the first resource is a resource in the CSI-RS resource set, where the processing module is further configured to determine to perform RLM or BFD by using any resource in the CSI-RS resource set.

In a possible design of the seventeenth aspect, the processing module is specifically configured to determine to perform RLM or BFD by using the resource corresponding to the maximum RSRP.

In a possible design of the seventeenth aspect, the communication device further includes:

a receiving module, configured to receive beam measurement reporting information, where the beam measurement reporting information indicates the terminal device to report only one RSRP, and the beam measurement reporting information further indicates the terminal device to be prohibited from reporting RSRPs corresponding to a plurality of resources that can be simultaneously received.

In a possible design of the seventeenth aspect, the communication device further includes:

a sending module, configured to send the maximum RSRP to the network device based on the beam measurement reporting information, where the processing module is specifically configured to determine, after a first preset time period after the maximum RSRP is sent to the network device, to perform RLM or BFD by using any resource in the CSI-RS resource set.

In a possible design of the seventeenth aspect, the processing module is further configured to determine the first preset time period based on a capability reported by the terminal device.

In a possible design of the seventeenth aspect, the processing module is specifically configured to determine, after a second preset time period after an end moment of the last resource in the CSI-RS resource set, to perform RLM or BFD by using any resource in the CSI-RS resource set.

In a possible design of the seventeenth aspect, the processing module is further configured to determine the second preset time period based on a capability reported by the terminal device.

In a possible design of the seventeenth aspect, the processing module is specifically configured to: determine, within a third preset time period including the CSI-RS resource set, the resource corresponding to the maximum RSRP, or determine the maximum RSRP and the resource corresponding to the maximum RSRP.

In a possible design of the seventeenth aspect, the CSI-RS resource set is a periodic resource, the third preset time period is obtained based on a measurement period T, and the measurement period T is obtained based on a quantity that is of resource repetitions in the CSI-RS resource set and that is preferred by the terminal device, a quantity of resources in the CSI-RS resource set, and a resource periodicity of the CSI-RS resource set.

In a possible design of the seventeenth aspect, Measurement period $T=m*ceil(max\_Number\_Rx\_Beam/N)*T\_res$, where m is a positive integer greater than 0, max_Number_Rx_Beam is the quantity that is of resource repetitions in the CSI-RS resource set and that is preferred by the terminal device, N is the quantity of resources in the CSI-RS resource set, and T_res is the resource periodicity of the CSI-RS resource set.

According to an eighteenth aspect, this application further provides a communication device. The communication device may be used as a terminal device to perform the communication method according to the tenth aspect, and has a same or similar technical feature and technical effect.

In a possible design of the eighteenth aspect, the communication device includes:

a measurement module, configured to: measure at least one first reference signal sent by a network device on at least one resource, and determine a resource corresponding to a maximum reference signal received power RSRP, where the at least one resource belongs to a channel state information-reference signal CSI-RS resource set, and the CSI-RS resource set is configured with repetition on; and a processing module, configured to determine a first resource configured by the network device for performing RLM or BFD, where the first resource is a resource in the CSI-RS resource set, where the processing module is further configured to perform RLM or BFD on the first resource by using a receive beam corresponding to the maximum RSRP.

In a possible design of the eighteenth aspect, the communication device further includes: a receiving module, configured to receive beam measurement reporting information, where the beam measurement reporting information indicates the terminal device to report only one RSRP, and the beam measurement reporting information further indicates the terminal device to be prohibited from reporting RSRPs corresponding to a plurality of resources that can be simultaneously received.

In a possible design of the eighteenth aspect, the communication device further includes:

a sending module, configured to send the maximum RSRP to the network device based on the beam measurement reporting information, where the processing module is specifically configured to determine, after a first preset time period after the maximum RSRP is sent to the network device, to perform RLM or BFD on the first resource by using the receive beam corresponding to the maximum RSRP.

In a possible design of the eighteenth aspect, the processing module is further configured to determine the first preset time period based on a capability reported by the terminal device.

In a possible design of the eighteenth aspect, the processing module is specifically configured to perform, after a second preset time period after an end moment of the last resource in the CSI-RS resource set, RLM or BFD on the first resource by using the receive beam corresponding to the maximum RSRP.

In a possible design of the eighteenth aspect, the processing module is further configured to determine the second preset time period based on a capability reported by the terminal device.

In a possible design of the eighteenth aspect, the processing module is specifically configured to: determine, within a third preset time period including the CSI-RS resource set, the resource corresponding to the maximum RSRP, or determine the maximum RSRP and the resource corresponding to the maximum RSRP.

In a possible design of the eighteenth aspect, the CSI-RS resource set is a periodic resource, the third preset time period is obtained based on a measurement period T, and the measurement period T is obtained based on a quantity that is of resource repetitions in the CSI-RS resource set and that is preferred by the terminal device, a quantity of resources in the CSI-RS resource set, and a resource periodicity of the CSI-RS resource set.

In a possible design of the eighteenth aspect, Measurement period T=m*ceil(max_Number_Rx_Beam/N)*T_res, where m is a positive integer greater than 0, max_Number_Rx_Beam is the quantity that is of resource repetitions in the CSI-RS resource set and that is preferred by the terminal device, N is the quantity of resources in the CSI-RS resource set, and T_res is the resource periodicity of the CSI-RS resource set.

According to a nineteenth aspect, this application further provides a communication device. The communication device may be used as a network device to perform the communication method according to the eleventh aspect, and has a same or similar technical feature and technical effect.

In a possible design of the nineteenth aspect, the communication device includes: a sending module, configured to send beam measurement reporting information to a terminal device, where the beam measurement reporting information indicates the terminal device to report only one RSRP, and the beam measurement reporting information further indicates the terminal device to be prohibited from reporting RSRPs of a plurality of resources that can be simultaneously received, where the sending module is further configured to send at least one first reference signal to the terminal device, where the at least one first reference signal is carried on at least one resource in a CSI-RS resource set, the beam measurement reporting information further indicates the terminal device to measure the at least one first reference signal and determine a maximum RSRP, and the CSI-RS resource set is configured with repetition on; and a receiving module, configured to receive the maximum RSRP sent by the terminal device.

According to a twentieth aspect, this application further provides a communication device. The communication device may be used as a terminal device to perform the communication method according to the twelfth aspect, and has a same or similar technical feature and technical effect.

In a possible design of the twentieth aspect, the communication device includes: a receiving module, configured to receive a transmission configuration indicator TCI state of first information, where the TCI state does not point to any resource in a channel state information-reference signal CSI-RS resource set, and the CSI-RS resource set is configured with repetition on, where the receiving module is further configured to receive the first information from a network device based on the TCI state of the first information, where the first information is a reference signal, or information carried on a PDCCH or a PDSCH; and the reference signal may be a reference signal used to perform any one of the following measurement: TRS measurement, CSI measurement, RLM measurement, or BFD measurement.

According to a twenty-first aspect, this application further provides a communication device. The communication device may be used as a network device to perform the communication method according to the thirteenth aspect, and has a same or similar technical feature and technical effect.

In a possible design of the twenty-first aspect, the communication device further includes: a sending module, configured to send a TCI state of first information to a terminal device, where the TCI state does not point to any resource in a CSI-RS resource set, and the CSI-RS resource set is configured with repetition on, where the sending module is further configured to send the first information to the terminal device, where the first information is a reference signal, or information carried on a PDCCH or a PDSCH; and the reference signal may be a reference signal used to perform any one of the following measurement: TRS measurement, CSI measurement, RLM measurement, or BFD measurement.

According to a twenty-second aspect, this application further provides a communication device. The communication device may be used as a terminal device to perform the communication method according to the fourteenth aspect, and has a same or similar technical feature and technical effect.

In a possible design of the twenty-second aspect, the communication device includes: a receiving module, configured to receive a reference signal sent by a network device, where the reference signal is not any resource in a channel state information-reference signal CSI-RS resource set, and the CSI-RS resource set is configured with repetition on; and the reference signal may be a reference signal used to perform RLM measurement or BFD measurement.

According to a twenty-third aspect, this application further provides a communication device. The communication device may be used as a network device to perform the communication method according to the fifteenth aspect, and has a same or similar technical feature and technical effect.

In a possible design of the twenty-third aspect, the communication device includes: a sending module, configured to send a reference signal to a terminal device, where the reference signal is not any resource in a CSI-RS resource set, and the CSI-RS resource set is configured with repetition on; and the reference signal may be a reference signal used to perform RLM measurement or BFD measurement.

According to a twenty-fourth aspect, this application further provides a communication device. The communication device includes a memory, a processor, and a computer program. The computer program is stored in the memory, and the processor runs the computer program to perform the method according to the possible designs of the eighth to tenth aspects, the twelfth aspect, or the fourteenth aspect.

According to a twenty-fifth aspect, this application provides a computer program product. The computer program product includes computer program code; and when the computer program code is run on a computer, the computer is enabled to perform the method according to the possible designs of the eighth to tenth aspects, the twelfth aspect, or the fourteenth aspect.

According to a twenty-sixth aspect, this application provides a chip. The chip includes a memory and a processor. The memory is configured to store a computer program, and the processor is configured to invoke and run the computer program from the memory, so that the processor performs the method according to the possible designs of the eighth aspect to the tenth aspect, the twelfth aspect, or the fourteenth aspect.

According to a twenty-seventh aspect, this application provides a storage medium. The storage medium includes a computer program, and the computer program is used to implement the method according to the possible designs of the eighth to tenth aspects, the twelfth aspect, or the fourteenth aspect.

According to a twenty-eighth aspect, this application provides a communication device. The communication device includes a memory, a processor, and a computer program. The computer program is stored in the memory, and the processor runs the computer program to perform the method according to the possible designs of the eleventh aspect, the thirteenth aspect, or the fifteenth aspect.

According to a twenty-ninth aspect, this application provides a storage medium. The storage medium includes a computer program, and the computer program is used to implement the method according to the possible designs of the eleventh aspect, the thirteenth aspect, or the fifteenth aspect.

According to a thirtieth aspect, this application provides a computer program product. The computer program product includes computer program code; and when the computer program code is run on a computer, the computer is enabled to perform the method according to the possible designs of the eleventh aspect, the thirteenth aspect, or the fifteenth aspect.

According to a thirty-first aspect, this application provides a chip. The chip includes a memory and a processor. The memory is configured to store a computer program, and the processor is configured to invoke and run the computer program from the memory, so that the processor performs the method according to the possible designs of the eleventh aspect, the thirteenth aspect, or the fifteenth aspect.

This application provides the communication method and the device. The method includes: The terminal device measures the at least one first reference signal sent by the network device on the at least one resource, and determines the resource corresponding to the maximum reference signal received power RSRP, where the at least one resource belongs to the channel state information-reference signal CSI-RS resource set, and the repetition of the CSI-RS resource set is configured as on; the terminal device receives the transmission configuration indicator TCI state of the first information, where the TCI state points to any resource in the CSI-RS resource set; and the terminal device determines that the resource to which the TCI state points and the resource corresponding to the maximum RSRP are quasi co-located QCL-ed or the first information and the resource corresponding to the maximum RSRP are quasi co-located QCL-ed. According to the communication method and the device provided in this application, when the TCI state of the first information points to any resource in the CSI-RS resource set configured with the repetition on, the first information is received by using the receive beam corresponding to the maximum RSRP. This can avoid communication performance deterioration.

Based on the implementations provided in the foregoing aspects, this application may be further combined to provide more implementations.

DETAILED DESCRIPTION OF ILLUSTRATIVE EMBODIMENTS

Figure 1:
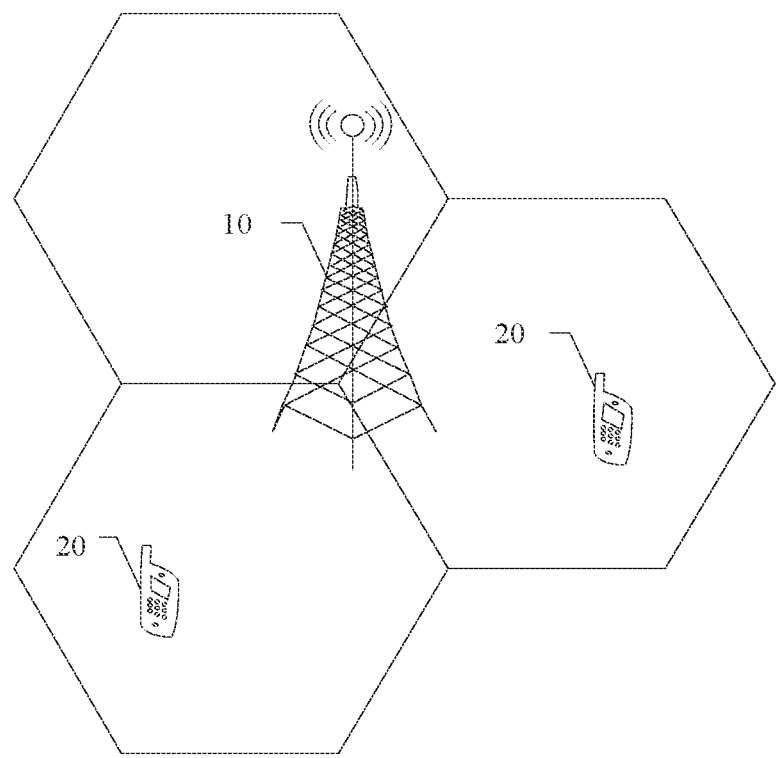
FIG. 1 is a schematic architectural diagram of a possible system according to this application.

The following describes technical solutions in this application with reference to the accompanying drawings.

It should be understood that the technical solutions of this application may be applied to a new radio (NR) communication technology. NR refers to a new generation radio access network technology, and may be applied to a future evolved network, for example, a 5th generation mobile communication (5G) system. This application is described by using an example in which this application is applied to a 5G communication system. It should be noted that the solutions in this application may be further applied to another wireless communication network, for example, a wireless fidelity (WIFI) network and a long term evolution (LTE) network, and a corresponding name may also be replaced with a name of a corresponding function in the another wireless communication network.

This application relates to a terminal device. The terminal device may include a wireless transceiver function and can cooperate with a network device to provide a communication service for a user. Specifically, the terminal device may be user equipment (UE), an access terminal, a subscriber unit, a subscriber station, a mobile station, a mobile station, a remote station, a remote terminal, a mobile device, a user terminal, a terminal, a wireless communication device, a user agent, or a user apparatus. For example, the terminal device may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, or a terminal device in a 5G network or a network after 5G. This is not limited in this application.

This application further relates to a network device. The network device may be a device configured to communicate with a terminal device. For example, the network device may be a base transceiver station (BTS) in a global system for mobile communications (GSM) system or a code division multiple access (CDMA) communication system, a NodeB (NB) in a wideband code division multiple access (WCDMA) system, or an evolved NodeB (eNB or eNodeB) in an LTE system. Alternatively, the network device may be a relay station, an access point, a vehicle-mounted device, a wearable device, a network-side device in a future 5G network or a network after 5G, a network device in a future evolved public land mobile network (PLMN), or the like.

The network device in this application may also be referred to as a radio access network (RAN) device. The RAN device is connected to the terminal device, and is configured to receive data from the terminal device and send the data to a core network device. The RAN device corresponds to different devices in different communication systems, for example, corresponds to a base station and a base station controller in a 2G system, corresponds to a base station and a radio network controller (RNC) in a 3G system, corresponds to an evolved NodeB (eNB) in a 4G system, and corresponds to an access network device (for example, a gNB, a central unit CU, or a distributed unit DU) in a 5G system such as an NR system.

FIG. 1 is a schematic architectural diagram of a possible system according to this application. As shown in FIG. 1, the system may include a network device 10 and at least one terminal device 20.

To satisfy increasing communication performance requirements, a growing quantity of network devices begin to use a multiple-input multiple-output (MIMO) technology. The MIMO technology is a technology for communication by using a directional beam (beam). That is, the network device concentrates transmit energy in a specific antenna direction, to improve an antenna gain. Considering that the terminal device may be distributed in any direction of the network device, and a direction and a location of the terminal device are not fixed, beam training needs to be performed when the network device communicates with the terminal device, to ensure a communication effect between the network device and the terminal device.

The beam in this application is a beam formed by performing amplitude and/or phase weighting on data transmitted or received by at least one antenna port, or may be a beam formed by using another method, for example, adjusting a related parameter of an antenna element. There may be two types of beams: a transmit beam and a receive beam. The transmit beam in this application refers to distribution of signal strength formed in different directions in space after a signal is transmitted through an antenna of the network device. The receive beam in this application refers to signal strength distribution, in different directions in space, of a radio signal received by the terminal device from an antenna.

In this application, a beam training process is usually performed on a per-CSI-RS resource set basis. Repetition is configured for the CSI-RS resource set used for the beam training.

When the repetition is configured as off, the terminal device considers that each resource in the CSI-RS resource set corresponds to one transmit beam of the network device, and the terminal device measures different transmit beams and reports a transmit beam with relatively good performance to the network device.

Figure 2:
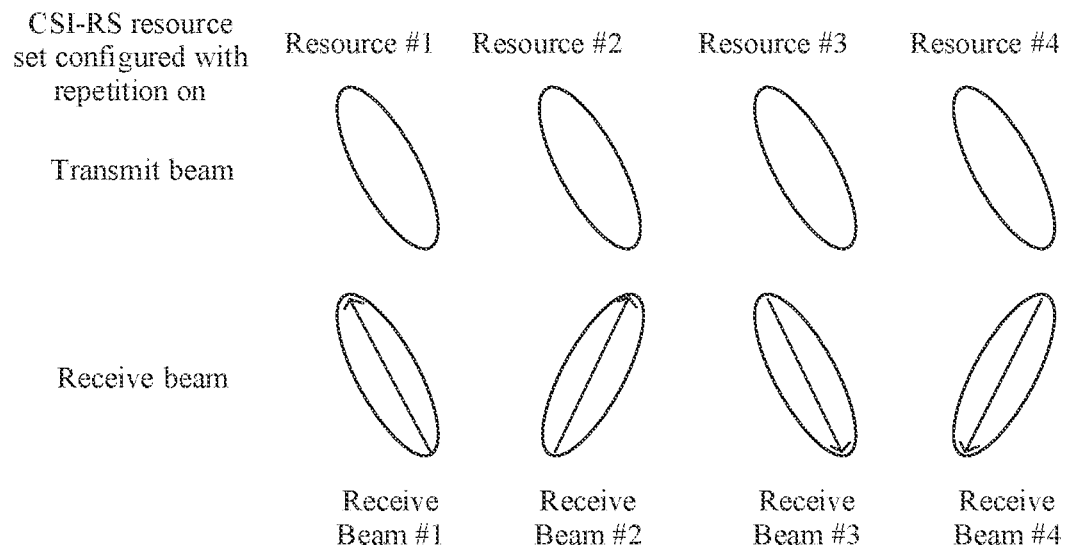
FIG. 2 is a schematic diagram of a possible receive beam setting of a terminal device.

When the repetition is configured as on, the terminal device considers that all resources in the CSI-RS resource set correspond to a same transmit beam of the network device, and the terminal device tries different receive beams on different resources, to select a receive beam (which is also referred to as an optimal receive beam below), with best performance, corresponding to the transmit beam. FIG. 2 is a schematic diagram of a possible receive beam setting of a terminal device. As shown in FIG. 2, one CSI-RS resource set may have four CSI-RS resources: a resource #1, a resource #2, a resource #3, and a resource #4, and the terminal device tries to use four different receive beams (a receive beam #1, a receive beam #2, a receive beam #3, and a receive beam #4) to receive transmit beams on the four resources.

It may be understood that, when communicating with the terminal device, the network device may improve performance of communication with the terminal device by using a quasi-co-location technology. For example, the network device configures a TCI state of to-be-sent information to point to a resource (for example, the resource #1 in FIG. 2) in a CSI-RS resource set configured with repetition on. In this way, the terminal device considers that the to-be-sent information and a reference signal on the resource may be received by using a same receive beam or a same receive spatial filtering parameter. Further, the terminal device may receive the to-be-sent information based on an optimal receive beam (for example, the receive beam #1 in FIG. 2) that corresponds to the reference signal and that is determined in a previous beam training process.

In another example, the network device may configure the terminal device to perform radio link monitoring RLM measurement or beam failure detection BFD measurement by using a resource (for example, the resource #1 in FIG. 2) in a CSI-RS resource set configured with repetition on. In this way, the terminal device may perform measurement based on an optimal receive beam (for example, the receive beam #1 in FIG. 2) that corresponds to a reference signal and that is determined in a previous beam training process.

However, there may be a case in which a reference signal corresponding to the resource (for example, the resource #2 in FIG. 2) to which the TCI state of the to-be-sent information points is inconsistent with the reference signal corresponding to the optimal receive beam (for example, the receive beam #1 in FIG. 2, where the receive beam #1 corresponds to the resource #1) determined by the terminal device. In this case, the terminal device cannot determine, based on a protocol of the communication system, a specific receive beam to be used. Therefore, there may be a case in which the terminal device receives information by using a second optimal receive beam, and consequently performance of communication between the terminal device and the network device deteriorates. Alternatively, there may be a case in which the terminal device monitors a link between the terminal device and the network device by using a second optimal receive beam, and consequently false detection of out-of-synchronization may be caused.

To resolve the foregoing problem, this application provides a communication method and device. The following describes, with reference to specific embodiments, examples of the communication method and device provided in this application.

Figure 3:
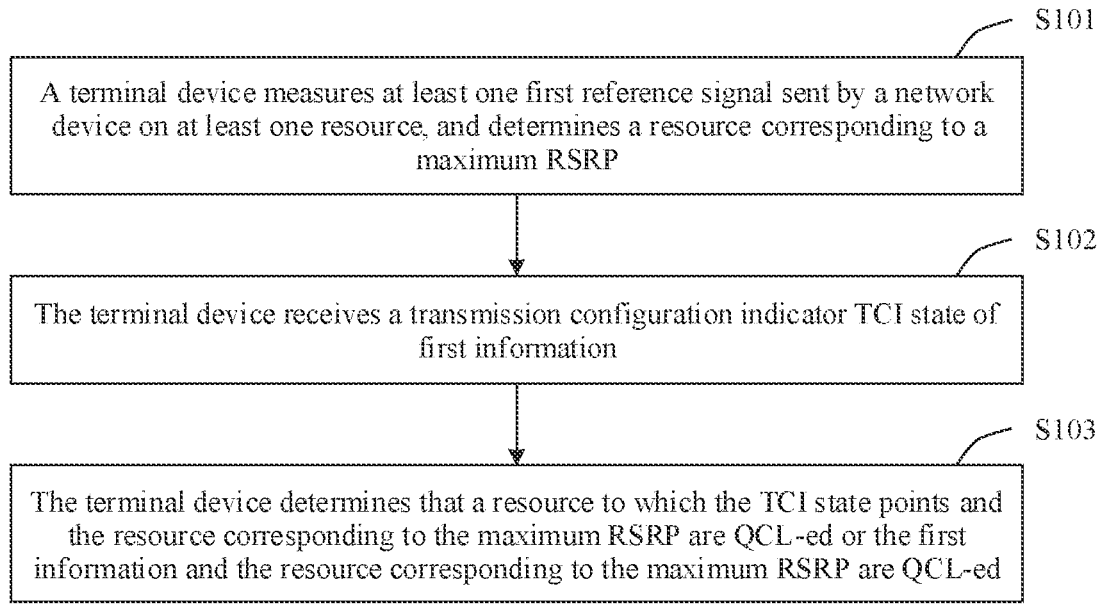
FIG. 3 is a schematic flowchart 1 of a communication method according to an embodiment of this application.

An aspect of this application provides a communication method. FIG. 3 is a schematic flowchart 1 of a communication method according to this application. A terminal device and a network device described in FIG. 3 and the following accompanying drawings may respectively correspond to the terminal device and the network device shown in FIG. 1. As shown in FIG. 3, the communication method includes the following steps.

S101: The terminal device measures at least one first reference signal sent by the network device on at least one resource, and determines a resource corresponding to a maximum RSRP.

The at least one resource belongs to a CSI-RS resource set, and the CSI-RS resource set is configured with repetition on.

Refer to FIG. 2. The network device sends the at least one first reference signal to the terminal device on the at least one resource in the CSI-RS resource set configured with the repetition on. The network device sends four first reference signals to the terminal device on four resources in the CSI-RS resource set, and the first reference signals on all the resources are from a same transmit beam. The terminal device measures reference signal received powers (RSRP) of the first reference signals by using different receive beams, to obtain the maximum RSRP and the resource (which may also be referred to as a CSI-RS resource) corresponding to the maximum RSRP. It may be understood that a plurality of receive beams may be configured on the terminal device, and different receive beams correspond to different directions. Therefore, for a same transmit beam, there may be a receive beam with best performance of communication. Therefore, as shown in FIG. 2, the terminal device may measure RSRPs of repeatedly occurring first reference signals by using receive beams in four different directions.

It may be understood that a quantity of resources in the CSI-RS resource set may be consistent with or inconsistent with a quantity of receive beams of the terminal device. When the quantity of receive beams of the terminal device is greater than the quantity of resources in the CSI-RS resource set, a plurality of occasions or occurrences of the CSI-RS resource set may be used to determine an optimal receive beam corresponding to the transmit beam.

S102: The terminal device receives a transmission configuration indicator TCI state of first information.

The TCI state points to any resource in the CSI-RS resource set.

For example, before sending the first information to the terminal device, the network device first sends the TCI state of the first information to the terminal device. In this embodiment, the TCI state of the first information may point to any resource in the CSI-RS resource set configured with the repetition on.

In a feasible implementation, the network device includes index information of a first resource in TCI information sent to the terminal device, and the index information may be the resource #1 in FIG. 2. Further, the TCI information sent by the network device to the terminal device may further carry a reference signal type of a reference signal on the first resource.

In a feasible implementation, the first information may be a second reference signal, or information carried on a PDCCH or a PDSCH.

The second reference signal may be a reference signal used to perform any one of the following measurement: time-frequency tracking reference signal (TRS) measurement, CSI measurement, radio link monitoring (RLM) measurement, or beam failure detection (BFD) measurement.

For example, the second reference signal may be a TRS, an SSB, a CSI-RS, or a DMRS. The CSI-RS may be a CSI-RS used for beam measurement or CSI measurement.

For example, the first information may be downlink control information (DCI) carried on the physical downlink control channel (PDCCH), or may be data information carried on the physical downlink shared channel (PDSCH).

S103: The terminal device determines that the resource to which the TCI state points and the resource corresponding to the maximum RSRP are QCL-ed or the first information and the resource corresponding to the maximum RSRP are QCL-ed.

In this embodiment, after the terminal device receives the TCI state that is of the first information and that is sent by the network device, the terminal device may determine QCL information of the first information based on the resource to which the TCI state points, to determine a receive beam for receiving the first information by the terminal device. When the TCI state points to any resource in the CSI-RS resource set configured with the repetition on, the terminal device may determine that the first information and the resource corresponding to the maximum RSRP are QCL-ed. Therefore, the terminal device may receive the first information by using a receive beam that corresponds to the resource corresponding to the maximum RSRP. The terminal device may alternatively determine that the resource to which the TCI state of the first information points and the resource corresponding to the maximum RSRP are QCL-ed. When receiving the first information or any information carried on the resource to which the TCI state points, the terminal device may perform receiving by using a receive beam that corresponds to the resource corresponding to the maximum RSRP.

For example, the first information may be the downlink control information (DCI) carried on the physical downlink control channel (PDCCH), or may be the data information carried on the physical downlink shared channel (PDSCH). When the TCI state of the first information on the PDCCH or the PDSCH points to any resource in the CSI-RS resource set configured with the repetition on, the terminal device may determine that a DM-RS of the PDCCH or the PDSCH and the resource corresponding to the maximum RSRP are QCL-ed. Therefore, the PDCCH or the PDSCH may be received by using the receive beam that corresponds to the resource corresponding to the maximum RSRP.

In the communication method provided in this application, when the terminal device determines that the TCI state of the first information points to any resource in the CSI-RS resource set configured with the repetition on, the terminal device may determine that the resource to which the first information/TCI state points and the resource corresponding to the maximum RSRP determined by the terminal device are quasi-co-located, so that the terminal device may receive the first information by using the receive beam corresponding to the maximum RSRP. This avoids communication performance deterioration that may be caused because the terminal device cannot determine the receive beam.

Figure 4:
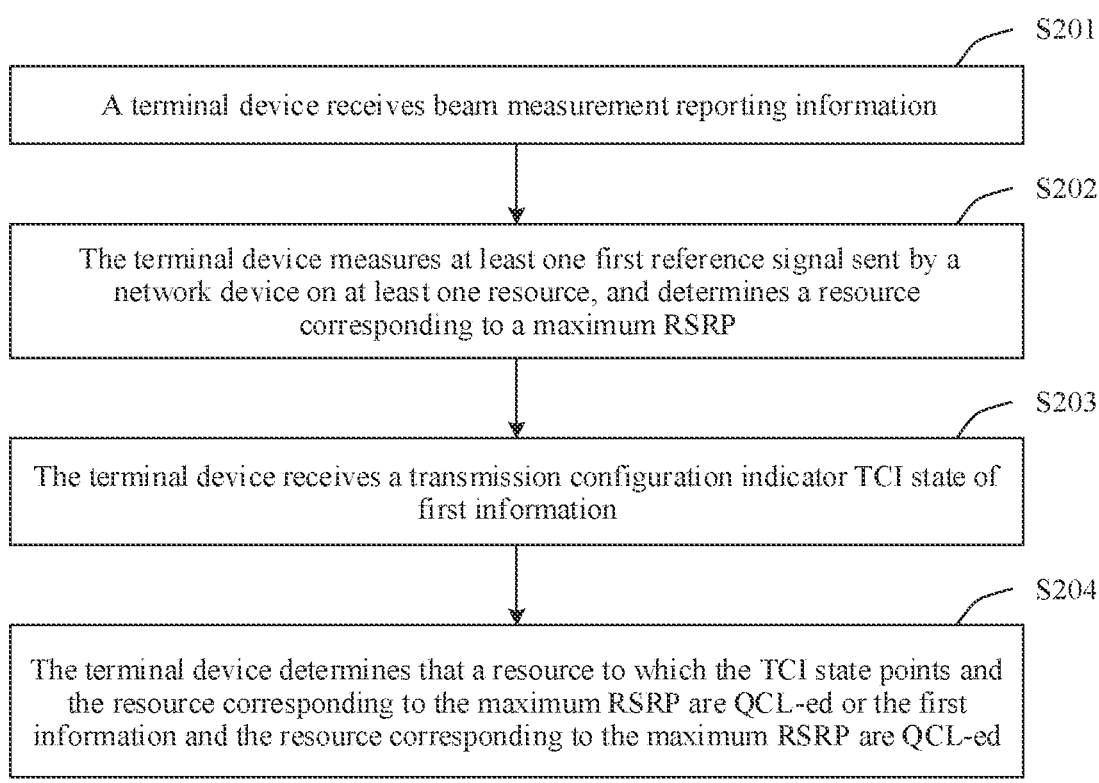
FIG. 4 is a schematic flowchart 2 of a communication method according to an embodiment of this application.

Based on the embodiment shown in FIG. 3, another aspect of this application further provides a communication method. In this embodiment, the terminal device further receives beam measurement reporting information sent by the network device. FIG. 4 is a schematic flowchart 2 of a communication method according to this application. As shown in FIG. 4, the communication method includes the following steps.

S201: The terminal device receives the beam measurement reporting information.

The beam measurement reporting information indicates the terminal device to report only one RSRP. The beam measurement reporting information further indicates the terminal device to be prohibited from reporting RSRPs corresponding to a plurality of resources that can be simultaneously received.

In this embodiment, the terminal device expects that reporting configuration (namely, the beam measurement reporting information) that is of a CSI-RS resource set and that is sent by the network device indicates to report an RSRP of one resource. For example, a value of an nr of Reported RS field in the beam measurement reporting information sent by the network device is configured as 1. In addition, the terminal device expects that the reporting configuration that is of the CSI-RS resource set and that is sent by the network device indicates not to report the RSRPs corresponding to the plurality of resources that can be simultaneously received. For example, a value of a group Based Beam Reporting field in the beam measurement reporting information sent by the network device is configured as disabled.

It may be understood that the beam measurement reporting information sent by the network device may be further used to indicate the terminal device not to report the RSRP.

For example, a value of a reportQuantity field in the beam measurement reporting information may be configured as none. When the value of the group Based Beam Reporting field in the beam measurement reporting information is configured as enabled, the reporting configuration that is of the CSI-RS resource set and that is sent by the network device indicates that beams that can be simultaneously received can be reported.

S202: The terminal device measures at least one first reference signal sent by the network device on at least one resource, and determines a resource corresponding to a maximum RSRP.

Based on this embodiment, after the determining a resource corresponding to a maximum RSRP in S202, the communication method provided in this application further includes the following steps:

The terminal device sends the maximum RSRP to the network device based on the beam measurement reporting information.

For example, the terminal device sends the maximum RSRP to the network device, so that the network device can conveniently determine a current channel condition of the terminal device to perform communication scheduling.

S203: The terminal device receives a transmission configuration indicator TCI state of first information.

The TCI state points to any resource in the CSI-RS resource set.

S204: The terminal device determines that the resource to which the TCI state points and the resource corresponding to the maximum RSRP are QCL-ed or the first information and the resource corresponding to the maximum RSRP are QCL-ed.

For example, S203 and S204 in this embodiment are the same as S102 and S103 in the embodiment shown in FIG. 3. Details are not described again in this application.

When the terminal device determines that the resource to which the TCI state points/the first information and the resource corresponding to the maximum RSRP are QCL-ed, the terminal device may receive the first information by using an optimal receive beam that corresponds to the resource corresponding to the maximum RSRP. The following describes an occasion on which the terminal device determines that the resource to which the TCI state points/the first information and the resource corresponding to the maximum RSRP are QCL-ed.

In a feasible implementation, if the terminal device sends the maximum RSRP to the network device, the terminal device determines, after a first preset time period after the terminal device sends the maximum RSRP to the network device, that the resource to which the TCI state points/the first information and the resource corresponding to the maximum RSRP are QCL-ed.

In another feasible implementation, if the terminal device does not send the maximum RSRP to the network device, the terminal device determines, after a second preset time period after an end moment of the last resource in the CSI-RS resource set, that the resource to which the TCI state points/the first information and the resource corresponding to the maximum RSRP are QCL-ed.

For example, both the first preset time period and the second preset time period may be several OFDM symbols, slots, subframes, or radio frames, or may be several time units such as microseconds, milliseconds, or seconds.

It may be understood that the terminal device may determine the first preset time period and/or the second preset time period based on a capability reported to the network device.

In the communication method provided in this application, the terminal device further receives the beam measurement reporting information that is of the CSI-RS resource set and that is sent by the network device, and the beam measurement reporting information indicates that the terminal device can report only one RSRP, and indicates the terminal device to be prohibited from reporting the RSRPs corresponding to the plurality of resources that can be simultaneously received, so that inconsistency between measurement behavior and measurement reporting information is avoided, resource waste caused by reporting a plurality of RSRPs by the terminal device is avoided, and the network device conveniently determines the current channel condition of the terminal device to perform communication scheduling.

Based on any one of the foregoing embodiments, this application further provides a communication method. In this embodiment, considering possible location and direction changes of the terminal device, the terminal device may periodically perform measurement on a resource in the CSI-RS resource set configured with the repetition on, or perform, based on triggering by a network, measurement on a resource in the CSI-RS resource set configured with the repetition on, to determine the optimal receive beam corresponding to the transmit beam.

In a possible implementation, the terminal device determines the maximum RSRP within a third preset time period including the CSI-RS resource set. For example, the terminal device further determines the resource corresponding to the maximum RSRP.

When the CSI-RS resource set is a periodic resource, the third preset time period may be obtained based on a measurement period T, and the measurement period T is obtained based on a quantity that is of resource repetitions in the CSI-RS resource set and that is preferred by the terminal device, a quantity of resources in the CSI-RS resource set, and a resource periodicity of the CSI-RS resource set.

In a feasible implementation, the measurement period T is obtained based on the quantity that is of resource repetitions in the CSI-RS resource set and that is preferred by the terminal device, the quantity of resources in the CSI-RS resource set, and the resource periodicity of the CSI-RS resource set. The following formula 1 may be specifically used:

Measurement period T=m*ceil(max_Number_Rx_Beam/N)*T_res formula 1, where m is a positive integer greater than 0, max_Number_Rx_Beam is the quantity that is of resource repetitions in the CSI-RS resource set and that is preferred by the terminal device, N is the quantity of resources in the CSI-RS resource set, and T_res is the resource periodicity of the CSI-RS resource set.

It may be understood that the third preset time period may be at least one measurement period T. Alternatively, the terminal device performs measurement on the CSI-RS resource set only when the quantity of resources in the CSI-RS resource set is greater than or equal to the quantity of receive beams of the terminal device or the quantity that is of resource repetitions in the CSI-RS resource set and that is preferred by the terminal.

Still another aspect of this application further provides a communication method. A difference of this embodiment from the foregoing embodiments in FIG. 3 and FIG. 4 lies in that the network device sends, to the terminal device, a reference signal used to perform BFD or RLM instead of the first information, and configures a resource in the CSI-RS resource set as a resource used to perform BFD or RLM.

Figure 5:
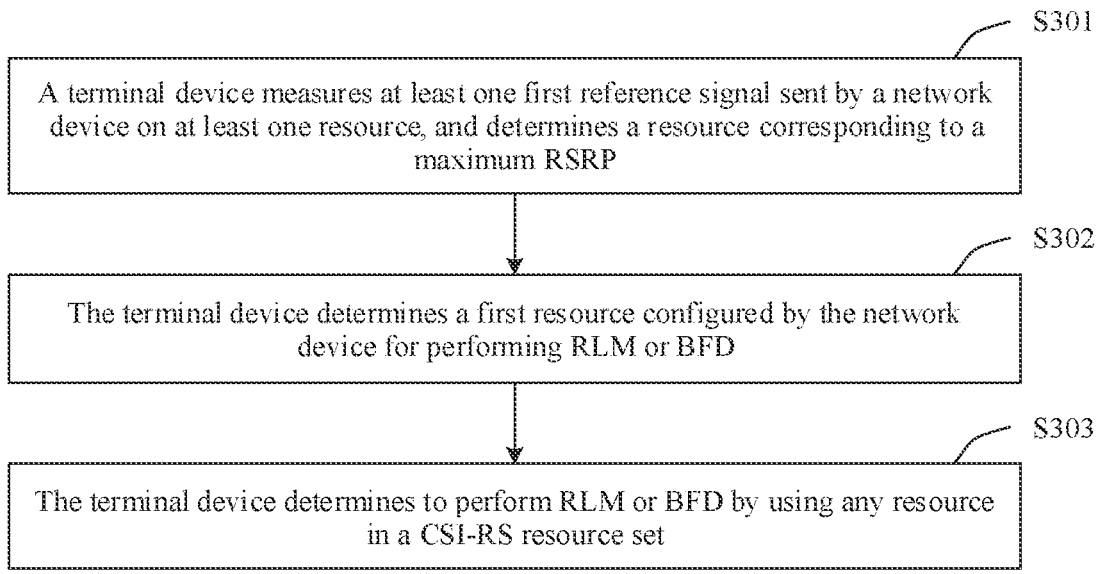
FIG. 5 is a schematic flowchart 3 of a communication method according to an embodiment of this application.

FIG. 5 is a schematic flowchart 3 of a communication method according to this application. As shown in FIG. 5, the communication method includes the following steps.

S301: A terminal device measures at least one first reference signal sent by a network device on at least one resource, and determines a resource corresponding to a maximum reference signal received power RSRP.

The at least one resource belongs to a channel state information-reference signal CSI-RS resource set, and the CSI-RS resource set is configured with repetition on.

For example, S301 in this embodiment is the same as S101 in the embodiment shown in FIG. 3. Details are not described again in this application.

S302: The terminal device determines a first resource configured by the network device for performing RLM or BFD.

The first resource for performing RLM or BFD is a resource in the CSI-RS resource set.

When the network device initiates RLM configuration or BFD configuration to the terminal device, the network device sends, to the terminal device, a reference signal for performing RLM or BFD, and configures the first resource for performing RLM or BFD. The first resource for performing RLM or BFD may be a resource in the CSI-RS resource set configured with the repetition on.

S303: The terminal device determines to perform RLM or BFD by using any resource in the CSI-RS resource set.

When the network device configures the terminal device to perform RLM or BFD on any resource in the CSI-RS resource set configured with the repetition on, the terminal device may determine to use any resource in the CSI-RS resource set to perform RLM or BFD. For example, the resource configured by the network device for performing RLM or BFD for the terminal device is the resource #1 in FIG. 2. The terminal device may determine, based on a measurement result on the CSI-RS resource set, to use any one of the resource #1 to the resource #4 to perform RLM measurement or BFD measurement. In a feasible implementation, the terminal device determines to perform RLM or BFD by using the resource corresponding to the maximum RSRP.

It may be understood that the communication method in this embodiment may be further combined with some features in the foregoing embodiments. For example, the terminal device in this embodiment may also receive the beam measurement reporting information in the embodiment in FIG. 4. The occasion on which the terminal device determines that the resource to which the TCI state points/the first information and the resource corresponding to the maximum RSRP are QCL-ed in the foregoing embodiment is also applicable to an occasion on which the terminal device determines to perform RLM or BFD by using any resource in the CSI-RS resource set in this embodiment. Details are not described again in this application.

In the communication method provided in this application, when the terminal device determines that the resource configured by the network device for performing RLM or BFD is any resource in the CSI-RS resource set configured with the repetition on, the terminal device may determine to perform RLM or BFD by using any resource in the CSI-RS resource set. This avoids false detection that is of out-of-synchronization and that may be caused because the terminal device cannot determine a specific receive beam to be used to perform RLM or BFD or uses a second optimal receive beam to perform RLM or BFD, or avoids affecting performance of measurement on the CSI-RS resource set because the terminal device uses a fixed receive beam on the resource configured by the network device for performing RLM or BFD.

Figure 6:
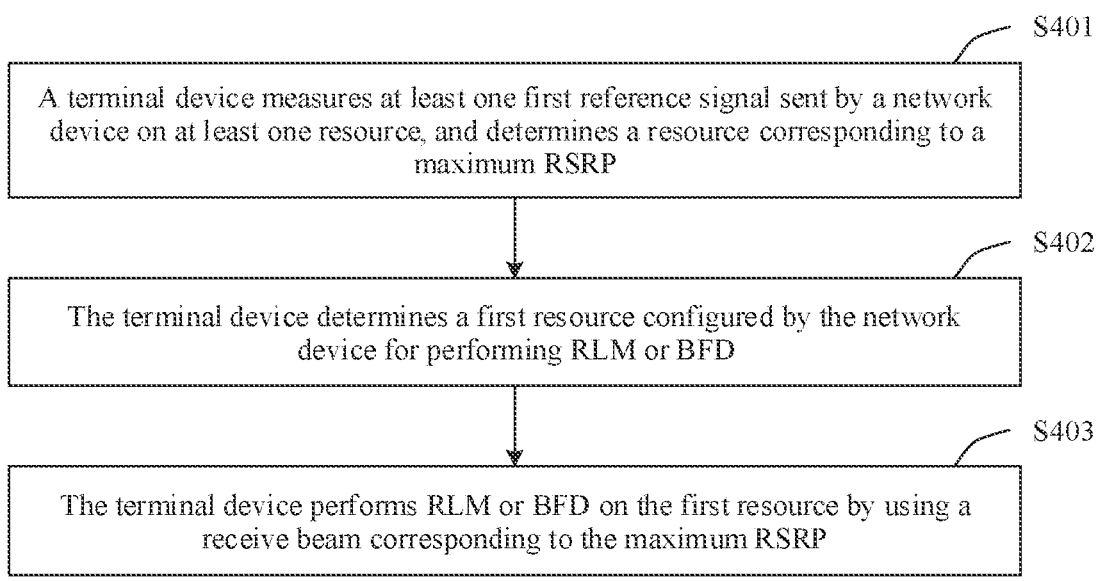
FIG. 6 is a schematic flowchart 4 of a communication method according to an embodiment of this application.

Yet another aspect of this application further provides a communication method. A difference of this embodiment from the foregoing embodiment in FIG. 5 lies in that the terminal device performs RLM or BFD on the first resource by using a receive beam corresponding to the maximum RSRP. FIG. 6 is a schematic flowchart 4 of a communication method according to this application. As shown in FIG. 6, the communication method includes the following steps.

S401: A terminal device measures at least one first reference signal sent by a network device on at least one resource, and determines a resource corresponding to a maximum reference signal received power RSRP.

The at least one resource belongs to a channel state information-reference signal CSI-RS resource set, and the CSI-RS resource set is configured with repetition on.

S402: The terminal device determines a first resource configured by the network device for performing RLM or BFD.

The first resource is a resource in the CSI-RS resource set.

For example, S401 and S402 in this embodiment are the same as S301 and S302 in the embodiment shown in FIG. 5. Details are not described again in this application.

S403: The terminal device performs RLM or BFD on the first resource by using a receive beam corresponding to the maximum RSRP.

When the network device configures the terminal device to perform RLM or BFD on the first resource in the CSI-RS resource set configured with the repetition on, the terminal device may determine to perform RLM or BFD on the first resource by using the receive beam corresponding to the maximum RSRP. The network device may further perform other data transmission on the resource corresponding to the maximum RSRP. In a feasible implementation, the terminal device determines to perform RLM or BFD by using the resource corresponding to the maximum RSRP.

It may be understood that the communication method in this embodiment may also be combined with some features in the embodiment in FIG. 3 or FIG. 4. For example, the terminal device in this embodiment may also receive the beam measurement reporting information in the embodiment in FIG. 4. The occasion on which the terminal device determines that the resource to which the TCI state points/ the first information and the resource corresponding to the maximum RSRP are QCL-ed in the foregoing embodiment is also applicable to an occasion on which RLM or BFD is performed on the first resource by using the receive beam corresponding to the maximum RSRP in this embodiment. Details are not described again in this application.

In the communication method provided in this application, when the terminal device determines that the resource configured by the network device for performing RLM or BFD is any resource in the CSI-RS resource set configured with the repetition on, the terminal device may determine to perform RLM or BFD on the first resource by using the receive beam corresponding to the maximum RSRP. This avoids false detection that is of out-of-synchronization and that may be caused because the terminal device cannot determine a specific receive beam to be used to perform RLM or BFD or uses a second optimal receive beam to perform RLM or BFD. In addition, the resource corresponding to the maximum RSRP is released, so that the network device conveniently performs other data transmission on the resource corresponding to the maximum RSRP.

Figure 7:
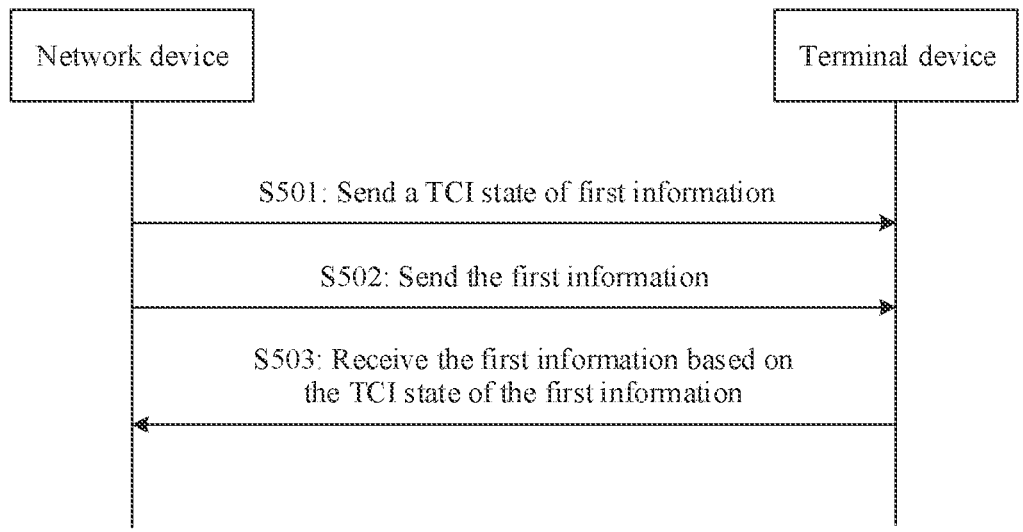
FIG. 7 is a signaling flowchart 1 of a communication method according to an embodiment of this application.

Yet another aspect of this application further provides a communication method. In this embodiment, the terminal device expects that the network device does not configure the TCI state of the first information to point to a resource in the CSI-RS resource set configured with the repetition on. FIG. 7 is a signaling flowchart 1 of a communication method according to this application. As shown in FIG. 7, the communication method includes the following steps.

S501: A network device sends a TCI state of first information to a terminal device.

The TCI state does not point to any resource in a CSI-RS resource set, and the CSI-RS resource set is configured with repetition on.

S502: The network device sends the first information to the terminal device.

S503: The terminal device receives the first information based on the TCI state of the first information.

The first information is a reference signal, or information carried on a PDCCH or a PDSCH; and the reference signal may be a reference signal used to perform any one of the following measurement: TRS measurement, CSI measurement, RLM measurement, or BFD measurement.

For example, the network device may configure the TCI state of the first information to point to a resource in a CSI-RS resource set configured with repetition off.

It may be understood that before S501, the communication method further includes the following step:

The terminal device measures at least one first reference signal sent by the network device on at least one resource, and determines a resource corresponding to a maximum RSRP. The at least one resource belongs to the CSI-RS resource set, and the repetition of the CSI-RS resource set is configured as on.

In the communication method provided in this embodiment, the terminal device expects that the TCI state that is of the first information and that is configured by the network device does not point to any resource in the CSI-RS resource set configured with the repetition on, to avoid communication performance deterioration that may be caused because the terminal device cannot determine a receive beam.

Figure 8:
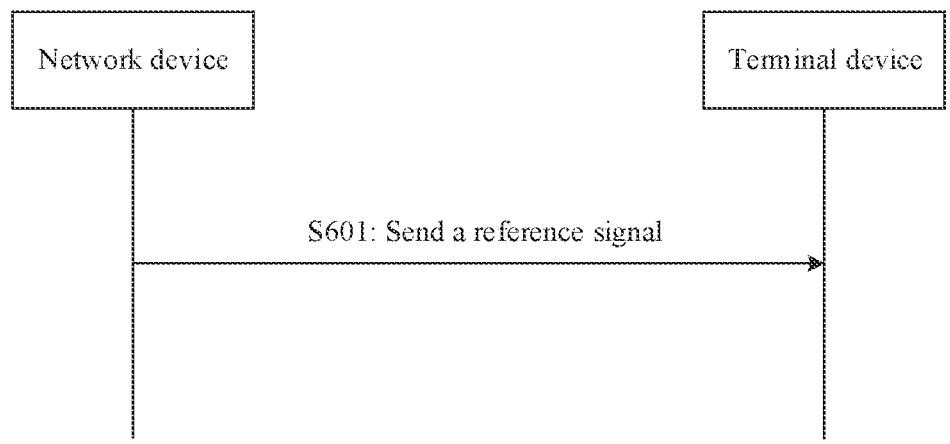
FIG. 8 is a signaling flowchart 2 of a communication method according to an embodiment of this application.

Yet another aspect of this application further provides a communication method. In this embodiment, the terminal device receives a reference signal that is sent by the network device and that is used to perform BFD or RLM, and the terminal device expects that the network device does not configure to perform BFD or RLM on a resource in the CSI-RS resource set configured with the repetition on. FIG. 8 is a signaling flowchart 2 of a communication method according to this application. As shown in FIG. 8, the communication method includes the following steps.

S601: A network device sends a reference signal to a terminal device.

A first reference signal is not any resource in a channel state information-reference signal CSI-RS resource set, and the CSI-RS resource set is configured with repetition on. The first reference signal may be a reference signal used to perform RLM measurement or BFD measurement.

For example, the network device may be configured to perform BFD or RLM on a resource in a CSI-RS resource set configured with repetition off.

It may be understood that before S601, the communication method further includes the following step:

The terminal device measures at least one first reference signal sent by the network device on at least one resource, and determines a resource corresponding to a maximum RSRP. The at least one resource belongs to the CSI-RS resource set, and the repetition of the CSI-RS resource set is configured as on.

In the communication method provided in this embodiment, the terminal device expects that the resource configured by the network device for performing BFD or RLM is not any resource in the CSI-RS resource set configured with the repetition on, to avoid false detection that is of out-of-synchronization and that may be caused because the terminal device cannot determine a receive beam.

This application further provides a communication device. The communication device may be used as a terminal device to perform actions performed by the terminal device in the method embodiments shown in FIG. 3 and FIG. 4, and have a same or similar technical feature and technical effect.

Figure 9:
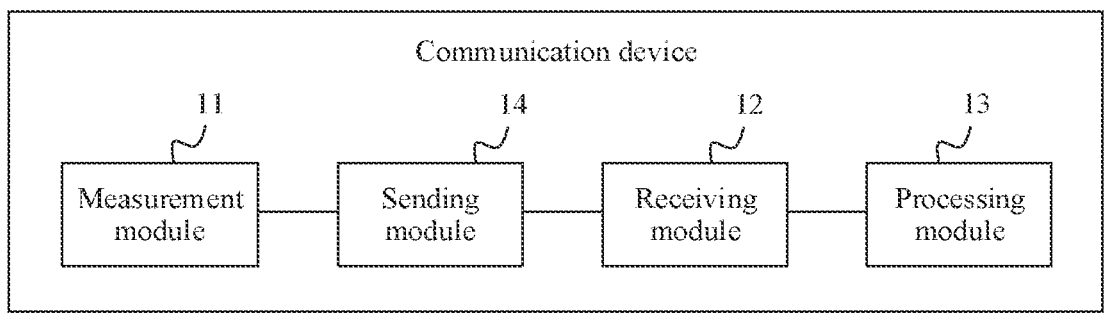
FIG. 9 is a schematic structural diagram 1 of a communication device according to an embodiment of this application.

FIG. 9 is a schematic structural diagram 1 of a communication device according to this application. As shown in FIG. 9, the terminal device includes:

a measurement module 11, configured to: measure at least one first reference signal sent by a network device on at least one resource, and determine a resource corresponding to a maximum RSRP, where the at least one resource belongs to a CSI-RS resource set, and the CSI-RS resource set is configured with repetition on;

a receiving module 12, configured to receive a TCI state of first information, where the TCI state points to any resource in the CSI-RS resource set; and a processing module 13, configured to determine that the resource to which the TCI state points and the resource corresponding to the maximum RSRP are quasi co-located QCL-ed or the first information and the resource corresponding to the maximum RSRP are quasi co-located QCL-ed.

In a possible design, the first information is information carried on a PDCCH or a PDSCH, or is a second reference signal used to perform any one of the following measurement:

TRS measurement, CSI measurement, RLM measurement, or BFD measurement.

In a possible design, the receiving module 12 is further configured to: receive beam measurement reporting information, where the beam measurement reporting information indicates the communication device to report only one RSRP, and the beam measurement reporting information further indicates the communication device to be prohibited from reporting RSRPs corresponding to a plurality of resources that can be simultaneously received.

In a possible design, as shown in FIG. 9, the following module is further included: a sending module 14, configured to send the maximum RSRP to the network device based on the beam measurement reporting information, where the processing module 13 is specifically configured to determine, after a first preset time period after the maximum RSRP is sent to the network device, that the resource to which the TCI state points and the resource corresponding to the maximum RSRP are QCL-ed or the first information and the resource corresponding to the maximum RSRP are QCL-ed.

In a possible design, the processing module 13 is further configured to determine the first preset time period based on a capability reported by the communication device.

In a possible design, the processing module 13 is specifically configured to determine, after a second preset time period after an end moment of the last resource in the CSI-RS resource set, that the resource to which the TCI state points and the resource corresponding to the maximum RSRP are QCL-ed or the first information and the resource corresponding to the maximum RSRP are QCL-ed.

In a possible design, the processing module 13 is further configured to determine the second preset time period based on a capability reported by the communication device.

In a possible design, the measurement module 11 is specifically configured to: determine, within a third preset time period including the CSI-RS resource set, the resource corresponding to the maximum RSRP, or determine the maximum RSRP and the resource corresponding to the maximum RSRP.

In a possible design, the CSI-RS resource set is a periodic resource, the third preset time period is obtained based on a measurement period T, and the measurement period T is obtained based on a quantity that is of resource repetitions in the CSI-RS resource set and that is preferred by the terminal device, a quantity of resources in the CSI-RS resource set, and a resource periodicity of the CSI-RS resource set.

In a possible design, Measurement period T=m*ceil (max_Number_Rx_Beam/N)*T_res, where m is a positive integer greater than 0, max_Number_Rx_Beam is the quantity that is of resource repetitions in the CSI-RS resource set and that is preferred by the terminal device, N is the quantity of resources in the CSI-RS resource set, and T_res is the resource periodicity of the CSI-RS resource set.

It should be understood that the processing module 13 in this application may be implemented by a processor or a processor-related circuit component, and the receiving module 12 and the sending module 14 may be implemented by a transceiver or a transceiver-related circuit component.

This application further provides a communication device. The communication device may be used as a terminal device to perform actions performed by the terminal device in the method embodiment shown in FIG. 5, and have a same or similar technical feature and technical effect.

Refer to FIG. 9. The communication device includes:

a measurement module 11, configured to: measure at least one first reference signal sent by a network device on at least one resource, and determine a resource corresponding to a maximum reference signal received power RSRP, where the at least one resource belongs to a channel state information-reference signal CSI-RS resource set, and the CSI-RS resource set is configured with repetition on; and a processing module 13, configured to determine a first resource configured by the network device for performing radio link monitoring RLM or beam failure detection BFD, where the first resource is a resource in the CSI-RS resource set, where the processing module 13 is further configured to determine to perform RLM or BFD by using any resource in the CSI-RS resource set.

In a possible design, the processing module 13 is specifically configured to determine to perform RLM or BFD by using the resource corresponding to the maximum RSRP.

In a possible design, a receiving module 12 is configured to receive beam measurement reporting information, where the beam measurement reporting information indicates the terminal device to report only one RSRP, and the beam measurement reporting information further indicates the terminal device to be prohibited from reporting RSRPs corresponding to a plurality of resources that can be simultaneously received.

In a possible design, a sending module 14 is configured to send the maximum RSRP to the network device based on the beam measurement reporting information, where the processing module 13 is specifically configured to determine, after a first preset time period after the maximum RSRP is sent to the network device, to perform RLM or BFD by using any resource in the CSI-RS resource set.

In a possible design, the processing module 13 is further configured to determine the first preset time period based on a capability reported by the terminal device.

In a possible design, the processing module 13 is specifically configured to determine, after a second preset time period after an end moment of the last resource in the CSI-RS resource set, to perform RLM or BFD by using any resource in the CSI-RS resource set.

In a possible design, the processing module 13 is further configured to determine the second preset time period based on a capability reported by the terminal device.

In a possible design, the processing module 13 is specifically configured to: determine, within a third preset time period including the CSI-RS resource set, the resource corresponding to the maximum RSRP, or determine the maximum RSRP and the resource corresponding to the maximum RSRP.

In a possible design, the CSI-RS resource set is a periodic resource, the third preset time period is obtained based on a measurement period T, and the measurement period T is obtained based on a quantity that is of resource repetitions in the CSI-RS resource set and that is preferred by the terminal device, a quantity of resources in the CSI-RS resource set, and a resource periodicity of the CSI-RS resource set.

In a possible design, Measurement period T=m*ceil(max_Number_Rx_Beam/N)*T_res, where m is a positive integer greater than 0, max_Number_Rx_Beam is the quantity that is of resource repetitions in the CSI-RS resource set and that is preferred by the terminal device, N is the quantity of resources in the CSI-RS resource set, and T_res is the resource periodicity of the CSI-RS resource set.

This application further provides a communication device. The communication device may be used as a terminal device to perform actions performed by the terminal device in the method embodiment shown in FIG. 6, and have a same or similar technical feature and technical effect.

Refer to FIG. 9. The communication device includes:

a measurement module 11, configured to: measure at least one first reference signal sent by a network device on at least one resource, and determine a resource corresponding to a maximum reference signal received power RSRP, where the at least one resource belongs to a channel state information-reference signal CSI-RS resource set, and the CSI-RS resource set is configured with repetition on; and a processing module 13, configured to determine a first resource configured by the network device for performing RLM or BFD, where the first resource is a resource in the CSI-RS resource set, where the processing module 13 is further configured to perform RLM or BFD on the first resource by using a receive beam corresponding to the maximum RSRP.

In a possible design, a receiving module 12 is configured to receive beam measurement reporting information, where the beam measurement reporting information indicates the terminal device to report only one RSRP, and the beam measurement reporting information further indicates the terminal device to be prohibited from reporting RSRPs corresponding to a plurality of resources that can be simultaneously received.

In a possible design, a sending module 14 is configured to send the maximum RSRP to the network device based on the beam measurement reporting information, where the processing module 13 is specifically configured to determine, after a first preset time period after the maximum RSRP is sent to the network device, to perform RLM or BFD on the first resource by using the receive beam corresponding to the maximum RSRP.

In a possible design, the processing module 13 is further configured to determine the first preset time period based on a capability reported by the terminal device.

In a possible design, the processing module 13 is specifically configured to perform, after a second preset time period after an end moment of the last resource in the CSI-RS resource set, RLM or BFD on the first resource by using the receive beam corresponding to the maximum RSRP.

In a possible design, the processing module 13 is further configured to determine the second preset time period based on a capability reported by the terminal device.

In a possible design, the processing module 13 is specifically configured to: determine, within a third preset time period including the CSI-RS resource set, the resource corresponding to the maximum RSRP, or determine the maximum RSRP and the resource corresponding to the maximum RSRP.

In a possible design, the CSI-RS resource set is a periodic resource, the third preset time period is obtained based on a measurement period T, and the measurement period T is obtained based on a quantity that is of resource repetitions in the CSI-RS resource set and that is preferred by the terminal device, a quantity of resources in the CSI-RS resource set, and a resource periodicity of the CSI-RS resource set.

In a possible design, Measurement period T=m*ceil(max_Number_Rx_Beam/N)*T_res, where m is a positive integer greater than 0, max_Number_Rx_Beam is the quantity that is of resource repetitions in the CSI-RS resource set and that is preferred by the terminal device, N is the quantity of resources in the CSI-RS resource set, and T_res is the resource periodicity of the CSI-RS resource set.

This application further provides a communication device. The communication device may be used as a terminal device to perform actions performed by the terminal device in the method embodiment shown in FIG. 7, and have a same or similar technical feature and technical effect.

As shown in FIG. 9, the terminal device includes:

a receiving module 12, configured to receive a transmission configuration indicator TCI state of first information, where the TCI state does not point to any resource in a channel state information-reference signal CSI-RS resource set, and the CSI-RS resource set is configured with repetition on, where the receiving module 12 is further configured to receive the first information from a network device based on the TCI state of the first information, where the first information is a reference signal, or information carried on a PDCCH or a PDSCH; and the reference signal may be a reference signal used to perform any one of the following measurement: TRS measurement, CSI measurement, RLM measurement, or BFD measurement.

This application further provides a communication device. The communication device may be used as a terminal device to perform actions performed by the terminal device in the method embodiment shown in FIG. 8, and have a same or similar technical feature and technical effect.

As shown in FIG. 9, the terminal device includes:

a receiving module 12, configured to receive a reference signal sent by a network device, where the reference signal is not any resource in a channel state information-reference signal CSI-RS resource set, and the CSI-RS resource set is configured with repetition on; and the reference signal may be a reference signal used to perform RLM measurement or BFD measurement.

Figure 10:
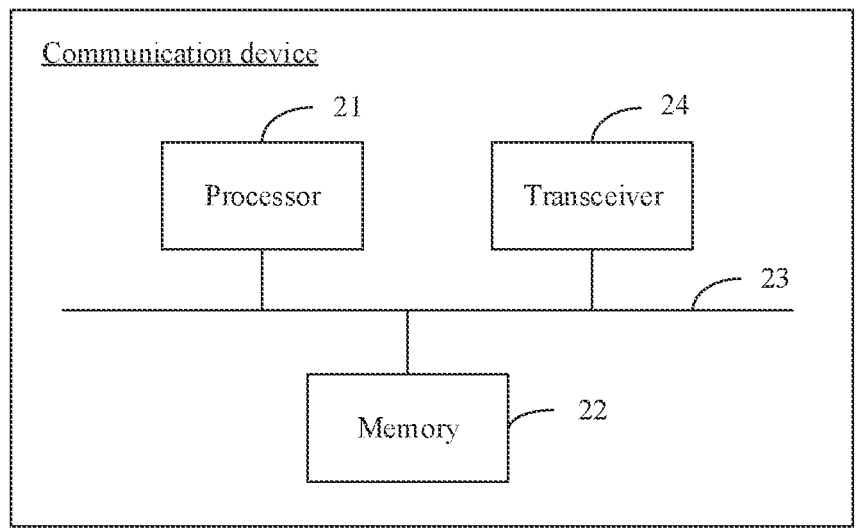
FIG. 10 is a schematic hardware diagram 1 of a communication device according to an embodiment of this application.

FIG. 10 is a schematic hardware diagram of a communication device according to this application. As shown in FIG. 10, the communication device includes a processor 21 and a memory 22, where the memory 22 is configured to store a computer program; and the processor 21 is configured to execute the computer program stored in the memory, to implement the methods performed by the terminal in FIG. 3 to FIG. 8. For details, refer to the related descriptions in the foregoing method embodiments.

Optionally, the memory 22 may be independent, or may be integrated with the processor 21.

When the memory 22 is a component independent of the processor 21, the communication device may further include: a bus 23, configured to connect the memory 22 and the processor 21. The communication device may further include a transceiver 24, configured to communicate with a network device and measure a reference signal, for example, receive first information, a TCI state of the first information, a first reference signal, and a second reference signal that are sent by the network device.

This application provides a storage medium. The storage medium includes a computer program, and the computer program is used to implement the methods performed by the terminal device in FIG. 3 to FIG. 8.

This application provides a computer program product. The computer program product includes computer program code; and when the computer program code is run on a computer, the computer is enabled to perform the methods performed by the terminal device in FIG. 3 to FIG. 8.

This application provides a chip. The chip includes a memory and a processor. The memory is configured to store a computer program, and the processor is configured to invoke and run the computer program from the memory, so that the processor performs the methods performed by the terminal device in FIG. 3 to FIG. 8.

This application further provides a communication device. The communication device may be used as a network device to perform actions performed by the terminal device in the method embodiments shown in FIG. 3 to FIG. 6, and have a same or similar technical feature and technical effect.

Figure 11:
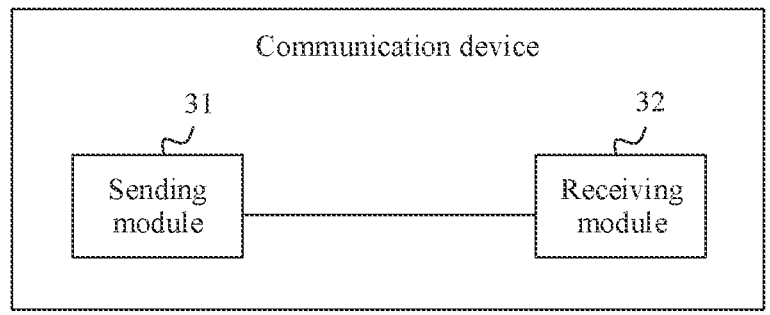
FIG. 11 is a schematic structural diagram 2 of a communication device according to an embodiment of this application.

FIG. 11 is a schematic structural diagram 2 of a communication device according to this application. As shown in FIG. 11, the network device includes:

a sending module 31, configured to send beam measurement reporting information to a terminal device, where the beam measurement reporting information indicates the terminal device to report only one RSRP, and the beam measurement reporting information further indicates the terminal device to be prohibited from reporting RSRPs of a plurality of resources that can be simultaneously received, where the sending module 31 is further configured to send at least one first reference signal to the terminal device, where the at least one first reference signal is carried on at least one resource in a CSI-RS resource set, the beam measurement reporting information further indicates the terminal device to measure the at least one first reference signal and determine a maximum RSRP, and the CSI-RS resource set is configured with repetition on; and a receiving module 32, configured to receive the maximum RSRP sent by the terminal device.

This application further provides a communication device. The communication device may be used as a network device to perform actions performed by the terminal device in the method embodiment shown in FIG. 7, and have a same or similar technical feature and technical effect.

Refer to FIG. 11. The network device includes:

a sending module 31, configured to send a TCI state of first information to a terminal device, where the TCI state does not point to any resource in a CSI-RS resource set, and the CSI-RS resource set is configured with repetition on, where the sending module 31 is further configured to send the first information to the terminal device, where the first information is a reference signal, or information carried on a PDCCH or a PDSCH; and the reference signal may be a reference signal used to perform any one of the following measurement: TRS measurement, CSI measurement, RLM, or BFD.

This application further provides a communication device. The communication device may be used as a network device to perform actions performed by the terminal device in the method embodiment shown in FIG. 8, and have a same or similar technical feature and technical effect.

Refer to FIG. 11. The network device includes:

a sending module 31, configured to send a reference signal to a terminal device, where the reference signal is not any resource in a CSI-RS resource set, and the CSI-RS resource set is configured with repetition on; and the reference signal may be a reference signal used to perform RLM measurement or BFD measurement.

It should be understood that the receiving module 32 and the sending module 31 in this application may be implemented by a transceiver or a transceiver-related circuit component.

Figure 12:
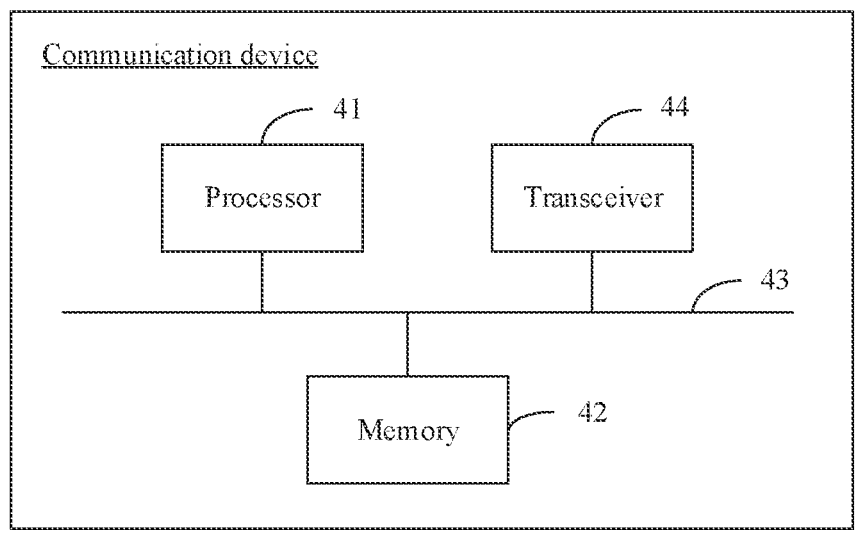
FIG. 12 is a schematic hardware diagram 2 of a communication device according to an embodiment of this application.

FIG. 12 is a schematic hardware diagram 2 of a communication device according to this application. As shown in FIG. 12, the network device includes a processor 41 and a memory 42, where the memory 42 is configured to store a computer program; and the processor 41 is configured to execute the computer program stored in the memory, to implement the methods performed by the network device in FIG. 3 to FIG. 8. For details, refer to the related descriptions in the foregoing method embodiments.

Optionally, the memory 42 may be independent, or may be integrated with the processor 41.

When the memory 42 is a component independent of the processor 41, the network device may further include:

a bus 43, configured to connect the memory 42 and the processor 41. The network device may further include a transceiver 44, configured to communicate with the terminal device, for example, send scheduling information, first information, and a reference signal to the terminal device.

This application provides a storage medium. The storage medium includes a computer program, and the computer program is used to implement the methods performed by the network device in FIG. 3 to FIG. 8.

This application provides a computer program product. The computer program product includes computer program code; and when the computer program code is run on a computer, the computer is enabled to perform the methods performed by the network device in FIG. 3 to FIG. 8.

This application provides a chip. The chip includes a memory and a processor. The memory is configured to store a computer program, and the processor is configured to invoke and run the computer program from the memory, so that the processor performs the methods performed by the network device in FIG. 3 to FIG. 8.

This application further provides a communication apparatus, and the communication apparatus may be a terminal device or a circuit. The communication apparatus may be configured to perform actions performed by the terminal device in the foregoing method embodiments.

Figure 13:
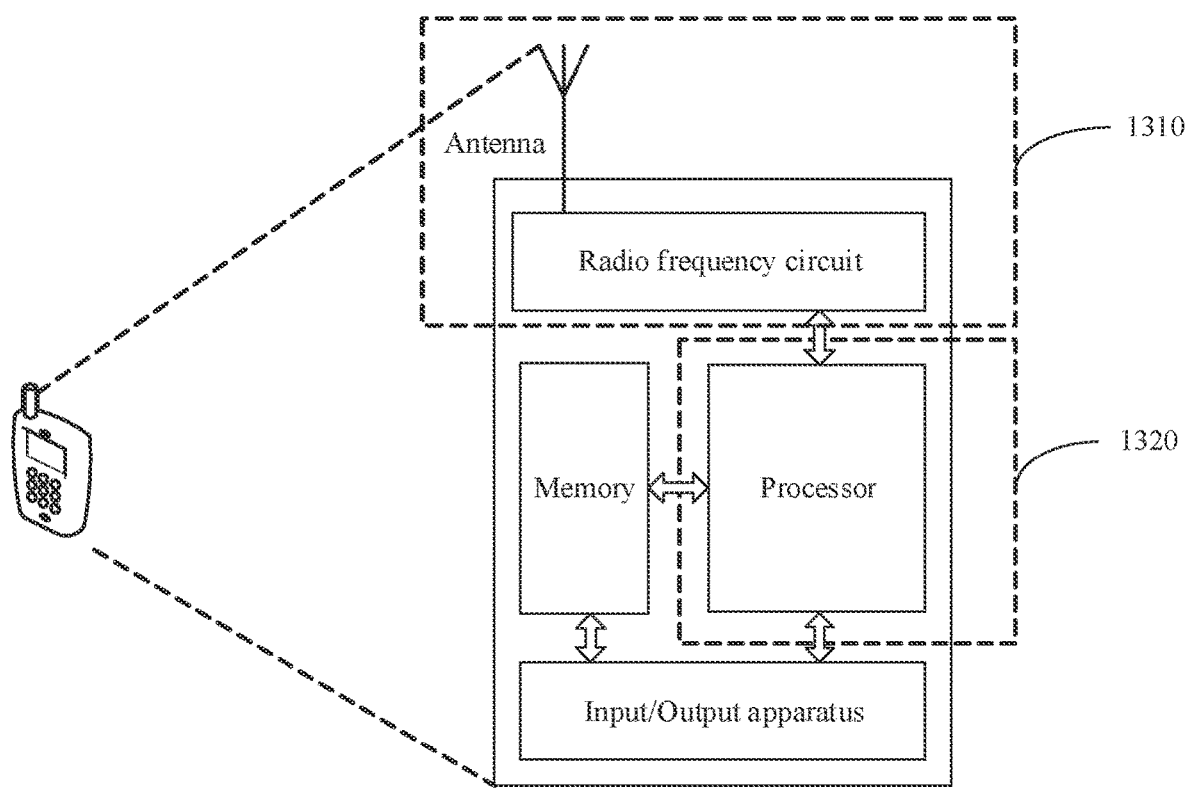
FIG. 13 is another schematic diagram of a communication device according to an embodiment of this application.

FIG. 13 is another schematic diagram of a communication apparatus according to this application. When the communication apparatus is a terminal device, FIG. 13 is a simplified schematic structural diagram of the terminal device. For ease of understanding and illustration, an example in which the terminal device is a mobile phone is used in FIG. 13. As shown in FIG. 13, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus, such as a touchscreen, a display screen, or a keyboard, is mainly configured to: receive data entered by a user, and output data to the user. It should be noted that some types of terminal devices may have no input/output apparatus.

When data needs to be sent, after performing baseband processing on to-be-sent data, the processor outputs a baseband signal to the radio frequency circuit. After performing radio frequency processing on the baseband signal, the radio frequency circuit sends the radio frequency signal to outside through the antenna in a form of an electromagnetic wave. When data is sent to the terminal device, the radio frequency circuit receives the radio frequency signal through the antenna, converts the radio frequency signal into a baseband signal, and outputs the baseband signal to the processor. The processor converts the baseband signal into data and processes the data. For ease of description, FIG. 13 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this application.

In this application, the antenna and the radio frequency circuit that have receiving and sending functions may be considered as a transceiver unit of the terminal device, and the processor having a processing function may be considered as a processing unit of the terminal device. As shown in FIG. 13, the terminal device includes a transceiver unit 1310 and a processing unit 1320. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1310 and configured to implement the receiving function may be considered as a receiving unit, and a component that is in the transceiver unit 1310 and configured to implement the sending function may be considered as a sending unit. In other words, the transceiver unit 1310 includes the receiving unit and the sending unit. The transceiver unit may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

It should be understood that the transceiver unit 1310 is configured to perform a sending operation and a receiving operation on a terminal device side in the foregoing method embodiments, and the processing unit 1320 is configured to perform an operation other than the receiving operation and the sending operation of the terminal device in the foregoing method embodiments.

For example, in an implementation, the transceiver unit 1310 is configured to perform the sending operation on the terminal device side in FIG. 3, and/or the transceiver unit 1310 is further configured to perform other sending and receiving steps on the terminal device side in this application. The processing unit 1320 is configured to perform the step in FIG. 2, and/or the processing unit 1320 is further configured to perform another processing step on the terminal device side in this application.

For another example, in another implementation, the transceiver unit 1310 is configured to perform the receiving operation on the terminal device side in S102 and S203 in FIG. 3, and/or the transceiver unit 1320 is further configured to perform other sending and receiving steps on the terminal device side in this application. The processing unit 1320 is configured to perform Sim and S103 in FIG. 3, and/or the processing unit 1320 is further configured to perform another processing step on the terminal device side in this application.

For still another example, in still another implementation, the transceiver unit 1310 is configured to perform the receiving operation on the terminal device side in S201 in FIG. 4, and/or the transceiver unit 1310 is further configured to perform other sending and receiving steps on the terminal device side in this application. The processing unit 1320 is configured to perform S202 and S204 in FIG. 4, and/or the processing unit 1320 is further configured to perform another processing step on the terminal device side in this application.

For still another example, in still another implementation, the processing unit 1320 is configured to perform S301 to S303 in FIG. 5, and/or the processing unit 1120 is further configured to perform another processing step on the terminal device side in this application.

For still another example, in still another implementation, the processing unit 1320 is configured to perform S401 to S403 in FIG. 6, and/or the processing unit 1320 is further configured to perform another processing step on the terminal device side in this application.

For still another example, in still another implementation, the transceiver unit 1310 is configured to perform the receiving operation on the terminal device side in S501 to S503 in FIG. 7, and/or the transceiver unit 1310 is further configured to perform other sending and receiving steps on the terminal device side in this application.

For still another example, in still another implementation, the transceiver unit 1310 is configured to perform the receiving operation on the terminal device side in S601 in FIG. 8, and/or the transceiver unit 1310 is further configured to perform other sending and receiving steps on the terminal device side in this application.

When the communication apparatus is a chip, the chip includes a transceiver unit and a processing unit. The transceiver unit may be an input/output circuit or a communication interface. The processing unit is a processor, a microprocessor, or an integrated circuit integrated on the chip.

Figure 14:
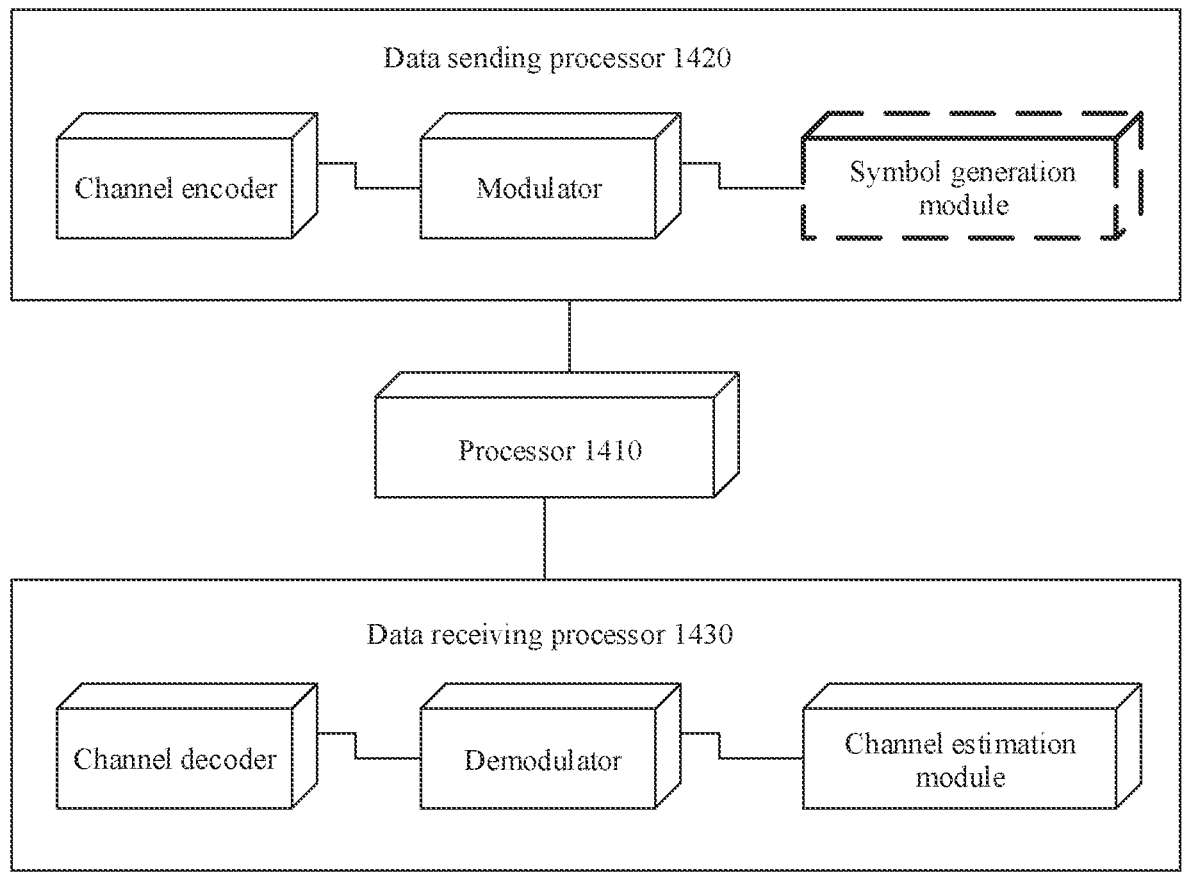
FIG. 14 is still another schematic diagram of a communication device according to an embodiment of this application.

When the communication device in this embodiment is a terminal device, FIG. 14 is still another schematic diagram of a communication device according to this application. Refer to the device shown in FIG. 14. In an example, the device may implement a function similar to that of the processor 21 in FIG. 10. In FIG. 14, the device includes a processor 1410, a data sending processor 1420, and a data receiving processor 1430. The processing module 13 and/or the measurement module 11 in the foregoing embodiment may be the processor 1410 in FIG. 14, and implement a corresponding function. The sending module 14 in the foregoing embodiment may be the data sending processor 1420 in FIG. 14, and/or the receiving module 12 may be the data receiving processor 1430 in FIG. 14. Although FIG. 14 shows a channel encoder and a channel decoder, it may be understood that the modules are merely examples, and do not constitute a limitation on this embodiment.

Figure 15:
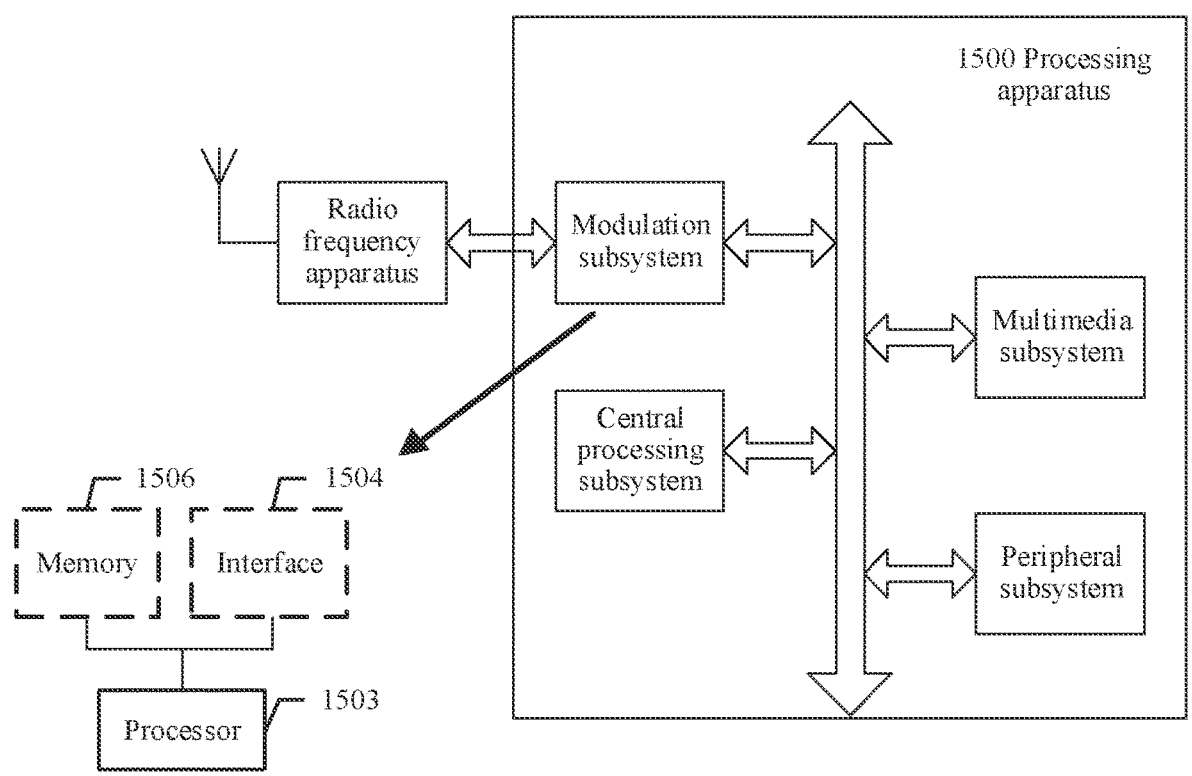
FIG. 15 is yet another schematic diagram of a communication device according to an embodiment of this application.

FIG. 15 is yet another schematic diagram of a communication device according to this application. FIG. 15 shows another form of this embodiment. A processing apparatus 1500 includes modules such as a modulation subsystem, a central processing subsystem, and a peripheral subsystem. The communication apparatus in the embodiments may be used as the modulation subsystem in the processing apparatus. Specifically, the modulation subsystem may include a processor 1503 and an interface 1504. The processor 1503 implements the function of the processing module 15, and the interface 1504 implements the functions of the sending module 14 and the receiving module 12. In another variation, the modulation subsystem includes a memory 1506, the processor 1503, and a program that is stored in the memory 1506 and that can be run on the processor. When executing the program, the processor 1503 implements the method on the terminal device side in the foregoing method embodiments. It should be noted that the memory 1506 may be nonvolatile or volatile. The memory 1506 may be located in the modulation subsystem, or may be located in the processing apparatus 1500, provided that the memory 1506 can be connected to the processor 1503.

Figure 16:
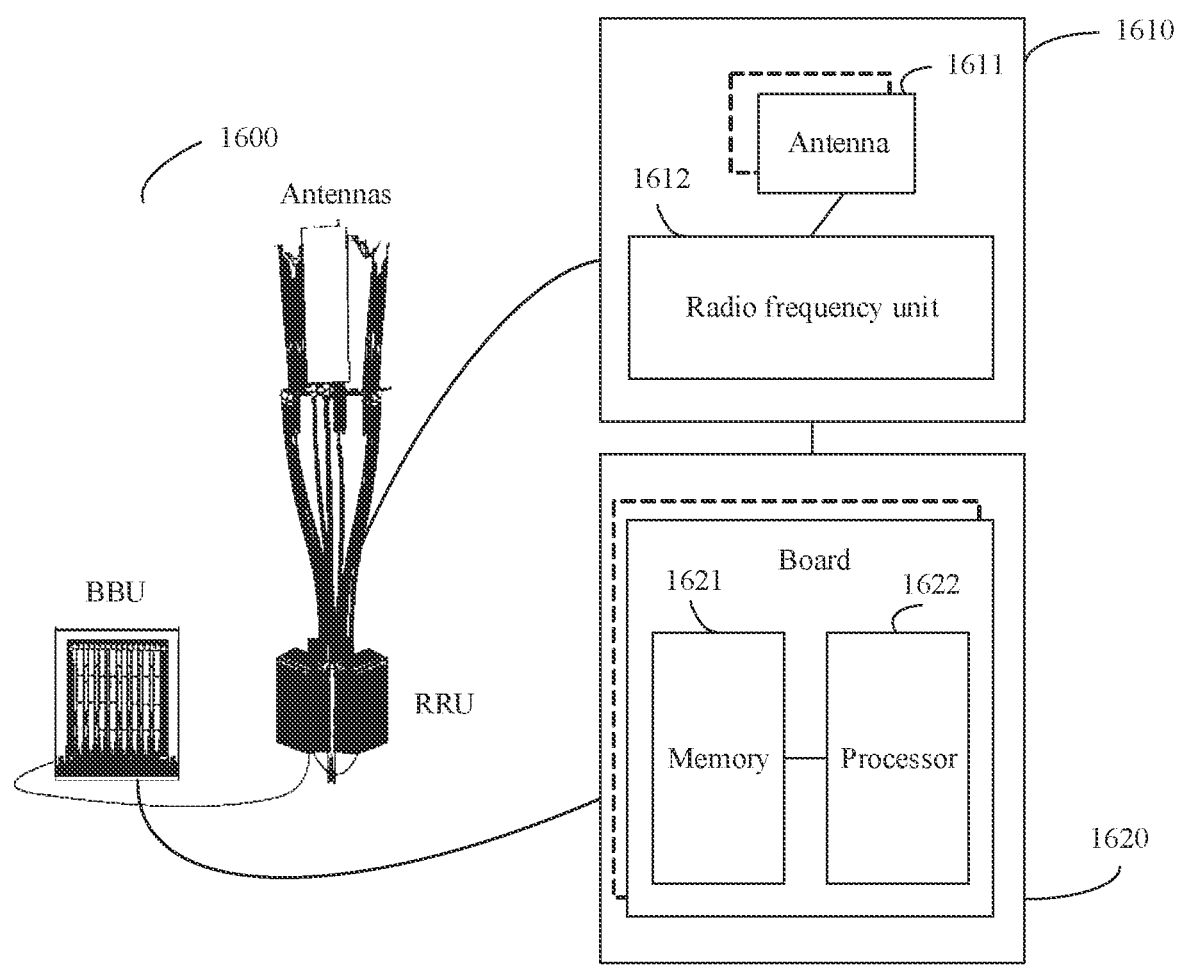
FIG. 16 is yet another schematic diagram of a communication device according to an embodiment of this application.

When the communication device is a network device, FIG. 16 is yet another schematic diagram of a communication device according to this application. The network device may be shown in FIG. 16. An apparatus 1600 includes one or more radio frequency units, such as a remote radio unit (RRU) 1610 and one or more baseband units (BBU) (which may also be referred to as digital units, digital units, DUs) 1620. The RRU 1610 may be referred to as a transceiver module, and corresponds to the sending module 31 and the receiving module 32 in FIG. 11. Optionally, the transceiver module may also be referred to as a transceiver machine, a transceiver circuit, a transceiver, or the like, and may include at least one antenna 1611 and a radio frequency unit 1612. The RRU 1610 is mainly configured to: send and receive a radio frequency signal, and perform conversion between the radio frequency signal and a baseband signal. For example, the RRU 1610 is configured to send indication information to a terminal device. The BBU 1620 is mainly configured to: perform baseband processing, control a base station, and so on. The RRU 1610 and the BBU 1620 may be physically disposed together, or may be physically separated, that is, in a distributed base station.

The BBU 1620 is a control center of the base station, may also be referred to as a processing module, and is mainly configured to implement a baseband processing function such as channel coding, multiplexing, modulation, and spreading. For example, the BBU (the processing module) may be configured to control the base station to perform an operation procedure related to the network device in the foregoing method embodiments, for example, generate the foregoing indication information.

In an example, the BBU 1620 may include one or more boards, and a plurality of boards may jointly support a radio access network (for example, an LTE network) having a single access standard, or may separately support radio access networks (for example, an LTE network, a 5G network, or another network) having different access standards. The BBU 1620 further includes a memory 1621 and a processor 1622. The memory 1621 is configured to store necessary instructions and data. The processor 1622 is configured to control the base station to perform a necessary action, for example, configured to control the base station to perform an operation procedure related to the network device in the foregoing method embodiments. The memory 1621 and the processor 1622 may serve the one or more boards. In other words, a memory and a processor may be independently disposed on each board. Alternatively, a plurality of boards may share a same memory and a same processor. In addition, a necessary circuit may be further disposed on each board.

It should be noted that the method or apparatus in this application may be applied to communication between a network device and a terminal device (for example, a base station and user equipment), communication between network devices (for example, a macro base stations and a micro base stations, a macro base station and a micro base station, or a micro base station and a micro base station), or communication between terminal devices (for example, a Device to Device (D2D)) scenario). In all the following embodiments of this application, communication between the network device and the terminal is used as an example for description.

It should be understood that, the processor mentioned in this application may be a central processing unit (CPU), or the processor may be another general-purpose processor, a digital signal processor (DSP), an application-specific integrated circuit (ASIC), a field programmable gate array (FPGA) or another programmable logic device, a discrete gate, or a transistor logic device, a discrete hardware component, or the like. The general-purpose processor may be a microprocessor, or the processor may be any conventional processor or the like.

It should be further understood that the memory mentioned in this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache.

Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA, or another programmable logic device, discrete gate or transistor logic device, or discrete hardware component, the memory (a storage module) is integrated into the processor.

It should be noted that the memory described in this specification aims to include but is not limited to these memories and any memory of another proper type.

It should further be understood that "first", "second", "third", "fourth", and various numbers in this specification are merely used for differentiation for ease of description, and are not construed as a limitation to the scope of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between associated objects.

It should be understood that sequence numbers of the foregoing processes do not mean execution sequences in the embodiments of this application. The execution sequences of the processes should be determined based on functions and internal logic of the processes, and should not be construed as any limitation on the implementation processes of this application.

A person of ordinary skill in the art may be aware that, in combination with the examples described in the embodiments disclosed in this specification, units and algorithm steps can be implemented by electronic hardware or a combination of computer software and electronic hardware. Whether the functions are performed by the hardware or the software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, applied to a communication device, the method comprising:
   receiving a reference signal from a network device; and
   in response to the reference signal not being included in a channel state information-reference signal (CSI-RS) resource set that is configured with repetition on, performing radio link monitoring (RLM) measurement or beam failure detection (BFD) measurement on the reference signal; and
   wherein a CSI-RS resource in the CSI-RS resource set is a periodic resource, and a measurement period T of the CSI-RS resource is based on a preferred number of CSI-RS resource repetitions of the CSI-RS resource set, a quantity of resources in the CSI-RS resource set, and a CSI-RS resource periodicity.

2. The method according to claim 1, wherein the measurement period T is obtained by:
   measurement period T=m*ceil(max_Number_Rx_Beam/N)*T_res, wherein
   m is a positive integer greater than 0, max_Number_Rx_Beam is the preferred number of CSI-RS resource repetitions of the CSI-RS resource set, N is the quantity of resources in the CSI-RS resource set, and T_res is the CSI-RS resource periodicity.

3. The communication method according to claim 1, wherein performing RLM measurement or BFD measurement on the reference signal comprises:
   performing RLM measurement on the reference signal.

4. The communication method according to claim 1, wherein performing RLM measurement or BFD measurement on the reference signal comprises:
   performing BFD measurement on the reference signal.

5. The communication method according to claim 1, wherein the communication device is a terminal device.

6. A communication method, applied to a network device, the method comprising:

generating a reference signal; and sending the reference signal, wherein when the reference signal is not included in a channel state information-reference signal (CSI-RS) resource set that is configured with repetition on, the reference signal is to be used for radio link monitoring (RLM) measurement or beam failure detection (BFD) measurement; and wherein a CSI-RS resource in the CSI-RS resource set is a periodic resource, and a measurement period T of the CSI-RS resource is based on a preferred number of CSI-RS resource repetitions of the CSI-RS resource set and that is preferred by a communication device, a quantity of resources in the CSI-RS resource set, and a CSI-RS resource periodicity.

7. The method according to claim 6, wherein the measurement period T is obtained by:

measurement period T=m*ceil(max_Number_Rx_Beam/N)*T_res, wherein m is a positive integer greater than 0, max_Number_Rx_Beam is the preferred number of CSI-RS resource repetitions of the CSI-RS resource set, N is the quantity of resources in the CSI-RS resource set, and T_res is the CSI-RS resource periodicity.

8. The communication method according to claim 6, wherein the reference signal is to be used for RLM measurement by a terminal device.

9. The communication method according to claim 6, wherein the reference signal is to be used for BFD measurement by a terminal device.

10. A communication device, comprising:

at least one processor, configured to cause the communication device to—:

receive a reference signal from a network device;

in response to the reference signal not being included in a channel state information-reference signal (CSI-RS) resource set that is configured with repetition on, perform radio link monitoring (RLM) measurement or beam failure detection (BFD) measurement on the reference signal; and wherein a CSI-RS resource of the CSI-RS resource set is a periodic resource, and a measurement period T of the CSI-RS resource is based on a preferred number of CSI-RS resource repetitions of the CSI-RS resource set, a quantity of resources in the CSI-RS resource set, and a CSI-RS resource periodicity.

11. The communication device according to claim 10, wherein the measurement period T is obtained by:

measurement period T=m*ceil(max_Number_Rx_Beam/N)*T_res, wherein m is a positive integer greater than 0, max_Number_Rx_Beam is the preferred number of CSI-RS resource repetitions of the CSI-RS resource set, N is the quantity of resources in the CSI-RS resource set, and T_res is the CSI-RS resource periodicity.

12. The communication device according to claim 10, wherein the at least one processor being configured to cause the communication device to perform RLM measurement or BFD measurement on the reference signal comprises the at least one processor being configured to cause the communication device to:

perform RLM measurement on the reference signal.

13. The communication device according to claim 10, wherein the at least one processor being configured to cause the communication device to perform RLM measurement or BFD measurement on the reference signal comprises the at least one processor being configured to cause the communication device to:

perform BFD measurement on the reference signal.

* * * * *

UNITED STATES PATENT AND TRADEMARK OFFICE
CERTIFICATE OF CORRECTION

PATENT NO. : 12,003,986 B2
APPLICATION NO. : 17/402122
DATED : June 4, 2024
INVENTOR(S) : Han et al.

It is certified that error appears in the above-identified patent and that said Letters Patent is hereby corrected as shown below:

In the Specification

In Column 32, Line 30, delete "Sim" and insert -- S101 --.

In the Claims

In Column 36, in Claim 2, Line 53, delete "o," and insert -- 0, --.

In Column 37, in Claim 7, Line 21, delete "o," and insert -- 0, --.

In Column 37, in Claim 10, Line 34, delete "to—:" and insert -- to: --.

In Column 38, in Claim 11, Line 17, delete "o," and insert -- 0, --.

Signed and Sealed this
Sixteenth Day of July, 2024

Katherine Kelly Vidal
*Director of the United States Patent and Trademark Office*